United States Patent
Mohajer et al.

(10) Patent No.: US 12,361,937 B2
(45) Date of Patent: Jul. 15, 2025

(54) METHOD AND SYSTEM FOR ASSISTING A USER

(71) Applicant: SoundHound AI IP, LLC, Santa Clara, CA (US)

(72) Inventors: Keyvan Mohajer, Los Gatos, CA (US); Kaishin Kam, Palo Alto, CA (US); Christophe Pierret, Sèvres (FR)

(73) Assignee: SoundHound AI IP, LLC, Santa Clara, CA (US)

( * ) Notice: Subject to any disclaimer, the term of this patent is extended or adjusted under 35 U.S.C. 154(b) by 500 days.

(21) Appl. No.: 17/561,548

(22) Filed: Dec. 23, 2021

(65) Prior Publication Data

US 2023/0206915 A1  Jun. 29, 2023

(51) Int. Cl.
*G10L 15/22* (2006.01)
*G01C 21/36* (2006.01)

(52) U.S. Cl.
CPC .......... *G10L 15/22* (2013.01); *G01C 21/3629* (2013.01); *G10L 2015/223* (2013.01); *G10L 2015/227* (2013.01); *G10L 2015/228* (2013.01)

(58) Field of Classification Search
USPC ................. 704/246, 247, 251, 252, 275
See application file for complete search history.

(56) References Cited

U.S. PATENT DOCUMENTS

| | | | |
|---|---|---|---|
| 2006/0074684 A1* | 4/2006 | Yoshida | G01C 21/36 704/271 |
| 2019/0378515 A1* | 12/2019 | Kim | G10L 17/22 |
| 2019/0392826 A1* | 12/2019 | Lee | G06V 20/59 |
| 2019/0392827 A1* | 12/2019 | Park | G10L 15/1815 |
| 2020/0005778 A1* | 1/2020 | Kim | G10L 15/30 |
| 2020/0013396 A1* | 1/2020 | Park | G10L 15/1815 |

* cited by examiner

*Primary Examiner* — Leonard Saint-Cyr
(74) *Attorney, Agent, or Firm* — Haynes Beffel & Wolfeld LLP; Andrew L. Dunlap; Jason Liao

(57) ABSTRACT

A method of assisting a user. The method including obtaining a plurality of rules having condition components and action components, the action components specifying conversation schemas, detecting, by a sensor, a fact related to an environment of the user, identifying a rule, of the plurality of rules, having a condition component that is satisfied by the detected fact, initiating a conversation with the user according to a conversation schema of the action component of the rule of the plurality of rules, and performing an action in response to a positive statement by the user.

15 Claims, 7 Drawing Sheets

METHOD AND SYSTEM FOR ASSISTING A USER

FIELD OF INVENTION

The technology disclosed relates to assisting a user using a virtual assistant that includes a proactive component. In particular, the technology disclosed relates to a virtual assistant that proactively initiates a conversation with a user in dependence upon the satisfaction of a condition of a rule using one or more obtained facts.

BACKGROUND

Virtual assistants that include speech recognition systems have become more prevalent in today's society. More and more everyday devices, such as appliances, vehicles, mobile devices, etc., are being equipped with virtual assistants having speech recognition capabilities. Conventional virtual assistants wait for a wake-up phrase or any other form of active and intentional user interaction in order to engage with the user. In many ways conventional virtual assistants are inferior to human assistants because human assistants have the intelligence to actively engage with other humans in order to provide assistance.

SUMMARY

Generally, the technology disclosed relates to a virtual assistant that has the capability to proactively engage a user. In particular, the technology disclosed can include a method of assisting a user. The method can include obtaining a plurality of rules having condition components and action components, the action components specifying conversation schemas, detecting, by a sensor, a fact related to an environment of the user, identifying a rule, of the plurality of rules, having a condition component that is satisfied by the detected fact, initiating a conversation with the user according to a conversation schema of the action component of the rule of the plurality of rules, and activating a motor in response to a positive statement by the user.

In an embodiment, the identifying of the rule can include identifying two or more rules having respective condition components that are satisfied in dependence on the detected fact, ranking the identified two or more rules in dependence on priority, and selecting a rule of the identified two or more rules having a highest priority, such that a conversation schema specified by an action component of the selected rule is used to initiate the conversation with the user.

In a further embodiment, the identifying of the rule can include identifying two or more rules having respective condition components that are satisfied in dependence on the detected fact, determining that the two or more rules are conflicting and applying an agenda to determine which of the conflicting rules is to be selected, such that a conversation schema specified by an action component of the selected rule is used to initiate the conversation with the user.

In an additional embodiment, the identifying of the rule can include identifying two or more action components included in the identified rule, ranking the two or more action components in dependence on priority, and selecting an action component of the two or more action components having a highest priority, such that a conversation schema specified by the selected action component is used to initiate the conversation with the user.

In an embodiment, the specified conversation schema can be at least one of a data structure, a script and a software component.

In another embodiment, the conversation can be initiated according to the conversation schema by determining a subject matter of the conversation to initiate with the user in dependence upon at least one of the condition component of the identified rule, the action component of the identified rule and the detected fact.

In a further embodiment, the method can include determining one or more parameters related to the conversation in dependence on at least one of the identified rule, the one or more facts and the determined subject matter.

In an embodiment the one or more parameters can include a conversation history according to which the conversation is initiated with the user, wherein the one or more parameters includes persistent data according to which the conversation is initiated with the user.

In another embodiment, the conversation can be initiated with the user in a written format.

In a further embodiment, conversation can be initiated with the user in a spoken format.

In an embodiment, conversation can be proactively initiated with the user without initial engagement from the user.

In another embodiment, the method can further include determining an appropriate time for initiating the conversation with the user and initiating the conversation with the user at the appropriate time.

In a further embodiment, the method can be performed by a virtual assistant that is at least partially included in a vehicle head unit of a vehicle.

In an embodiment, the conversation schema can specify initiating a new conversation with the user that provides a reminder about sensor information.

In another embodiment, the method can further include, in dependence on the identified rule having the condition component satisfied by the detected fact identifying an event on a roadway to be travelled by the user along a current navigation route, using the detected fact, the conversation schema and navigation information to determine that the user will arrive late to their destination because of the identified event on the roadway and initiate the conversation to ask the user whether or not to notify an individual regarding the late arrival.

In further embodiment, a system including one or more processors coupled to memory is provided. The memory can be loaded with computer instructions to assist a user, the computer instructions, when executed on the one or more processors, can cause the one or more processors to implement actions including obtaining a plurality of rules having condition components and action components, the action components specifying conversation schemas, detecting, by a sensor, a fact related to an environment of the user, identifying a rule, of the plurality of rules, having a condition component that is satisfied by the detected fact, initiating a conversation with the user according to a conversation schema of the action component of the rule of the plurality of rules, and activating a motor in response to a positive statement by the user.

In another embodiment, a method of assisting a user is provided. The method can include obtaining a plurality of rules having condition components and action components, the action components specifying conversation schemas, detecting a fact related to the user, identifying a rule, of the plurality of rules, having a condition component that is satisfied by the detected fact, initiating a conversation with the user according to a conversation schema of the action component of the rule of the plurality of rules, and performing an action in response to a positive statement by the user.

In an embodiment the detected fact can be obtained from an electronic calendar of the user.

In another embodiment, the conversation schema can specify initiating a new conversation with the user that provides a reminder about user information.

Particular aspects of the technology disclosed are described in the claims, specification and drawings.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

As mentioned above, some conventional virtual assistants wait for a wake-up phrase or any other form of active and intentional user interaction in order to engage with the user. The technology disclosed provides a proactive virtual assistant that collects facts about the user or the environment of the user and uses those facts, along with rules triggered by the facts, to proactively engage with the user. For example, a user would much more prefer a proactive virtual assistant that takes its own initiative, such that, for example, when the user gets into a vehicle, the virtual assistant will ask the user if they want the door to be closed and, when it is rainy, the virtual assistant will propose to find a covered parking location at a destination, as opposed to a non-covered parking location. By collecting information (e.g., facts) about the user and the environment of the user, the proactive virtual assistant can take initiative by applying predetermined logic (rules) on the collected information and intelligently decide whether to proactively initiate a conversation with the user and when to proactively initiate the conversation with the user.

Figure 1:
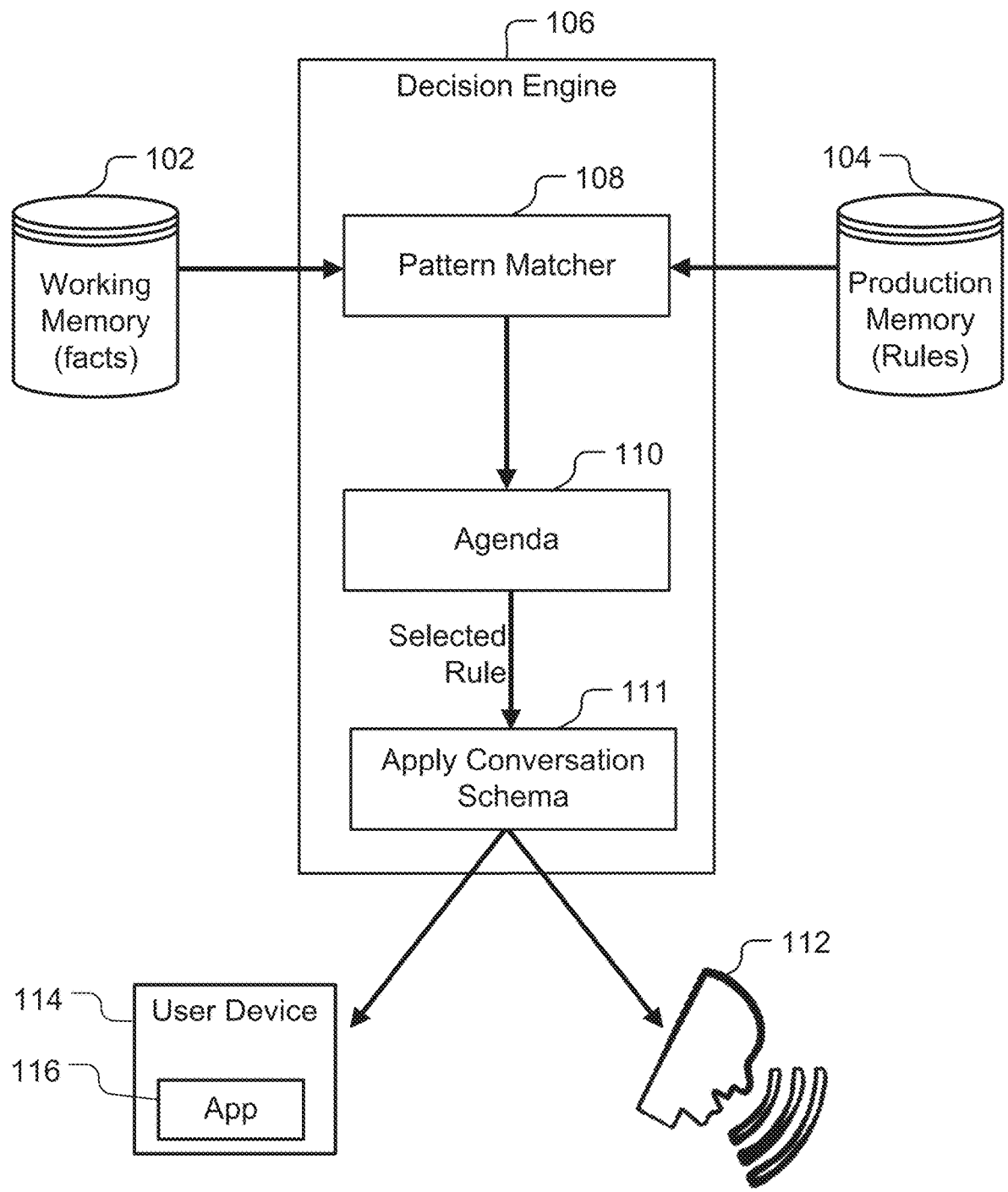
FIG. 1 is a block diagram that illustrates an example environment in which a proactive virtual assistant can be implemented.

FIG. 1 is a block diagram that illustrates an example environment in which a proactive virtual assistant can be implemented.

Referring to FIG. 1, the environment 100 includes a working memory 102 that stores facts, a production memory 104 that stores rules to be applied to the stored facts and a decision engine 106 that applies the stored facts to the stored rules to identify a rule that is satisfied by one or more of the stored facts and that could be a candidate for proactively initiating a conversation with the user. The working memory 102 and the production memory 104 can be separate physical memories or they can be part of the same physical memory. Further, the working memory 102 and the production memory 104 can be databases or other file structures stored in a storage device. The decision engine 106 includes a pattern matcher 108 and an agenda 110. The pattern matcher 108 can observe the stored facts and determine which, if any, rules apply to the facts (e.g., which rules are satisfied by facts). The pattern matcher 108 can (i) "match" multiple rules to the facts, (ii) "match" a single rule to the facts, or (iii) return a result that none of the rules "match" the facts.

The agenda 110 can resolve conflicting rules if two or more conflicting rules are identified by the pattern matcher 108. The agenda 110 can also prioritize rules if multiple non-conflicting rules are identified by the pattern matcher 108. An example of conflicting rules would be, based on a detected facial expression or gesture of the user (e.g., an expression of being uncomfortable), identifying one rule that proactively asks the user if they want the air conditioner in their vehicle turned on and identifying another conflicting rule that proactively asks the user if they want the heater turned on. The agenda 110 could use additional information to prioritize these conflicting rules and determine which proactive question should be presented to the user. To further elaborate on this example, the agenda could use additional information, such as ambient cabin temperature of the vehicle, outdoor temperature information and historical information regarding the heating ventilation and air conditioning (HVAC) system of the vehicle to determine whether the "air conditioner" rule or the "heater" rule should be followed.

If two or more rules are identified as having condition components that are satisfied by one or more facts, the agenda 110 can rank the two or more rules in dependence on priority. Priority can be pre-defined for rules or action components of those rules or priority can be defined based on historical data collected from previous interactions with users. The agenda 110 will then select the rule having the highest priority. Furthermore, a satisfied rule can have two or more action components included therein. In order to determine which action component to select (e.g., which action to perform first), the agenda 110 can rank the actions based on their priority and then select the action component having the highest priority as the first action component for which an action is to be performed.

Once a single rule is identified (selected) by the agenda 110, the selected rule is passed to element 111 which applies a conversation schema for performing speech conversation 112 or for performing a non-speech conversation on a screen of the user device 114. The speech conversation 112 can be initiated (using speakers and microphones) in dependence upon the identified rule or a non-speech (e.g., written) conversation can be initiated on a screen of a user device 114 running an application 116. In some embodiments, the working memory 102, production memory 104, and decision engine 106 are implemented as components of a user device.

Each rule can include multiple components. For example, a rule can include a condition component, which is essentially logic used to determine whether or not one or more facts satisfies one more conditions. A condition component can just include one simple condition or it can include multiple conditions. More detailed examples are provided later on in this document, but a simple example of a condition component of a rule for proactively engaging with a user in a particular manner could be (i) do recently obtained facts identify a particular user (e.g., facial recognition) and (ii) has it been more than 24 hours since the user has interacted with the virtual assistant. If items (i) and (ii) are satisfied, then the condition component of the rule has been satisfied.

Each rule can also include an action component. Similar to the condition component, an action component can include just a single action or it can include multiple actions. An action can identify or specify one or more conversation schemas according to which a new (proactive) conversation can be started. A conversation schema can include various types of data exchanges between the virtual assistant 302, the decision engine 106 and the proactive voice platform 310. Conversation schemas are described in more detail below. Referring to the example above, once items (i) and (ii) are satisfied, the virtual assistant can initiate a conversation with the user by performing one or more actions included in the action component of the rule. Referring to the simple example from above, the action component can initiate a conversation with the user by speaking "Hello [name of user], it has been a while since we have last spoke, is there anything I can help you with?" Here, the two conditions of the condition component of the particular rule are "matched" by the pattern matcher 108 because the facts from the working memory 102 "match" the condition component of the particular rule of the rules stored in the production memory 104. Since only one rule was identified by the pattern matcher 108, the agenda 110 does not need to resolve a conflict or prioritize any of the identified rules. The pattern matcher 108 can use various algorithms known to those who are skilled in the art. The identification of the rules and the initiating of the conversation with the user can be more complex than described above. These complexities are described below with reference to additional figures (e.g., see the description of the inference engine 602 of FIG. 6).

An administrator of a virtual assistant system can parameterize and define rules in order to customize the virtual assistant to operate in a particular environment. For example, an administrator or a designer of a virtual assistant that operates in a vehicle can be customized to implement actions based on conditions that are specific to the environment of the vehicle and to consider facts that are collected by the vehicle as well as facts that are external to the vehicle. The actions can also be customized to define actions that can be relevant to the device the user is interacting with. For example, the actions that can be taken using various components of a vehicle will be much different than actions that can be taken by a washing machine or a smart phone. Administrators of the virtual assistant or manufacturers of the devices that run the virtual assistant can be permitted to tailor the actions based on the capabilities of the devices.

Figure 2:
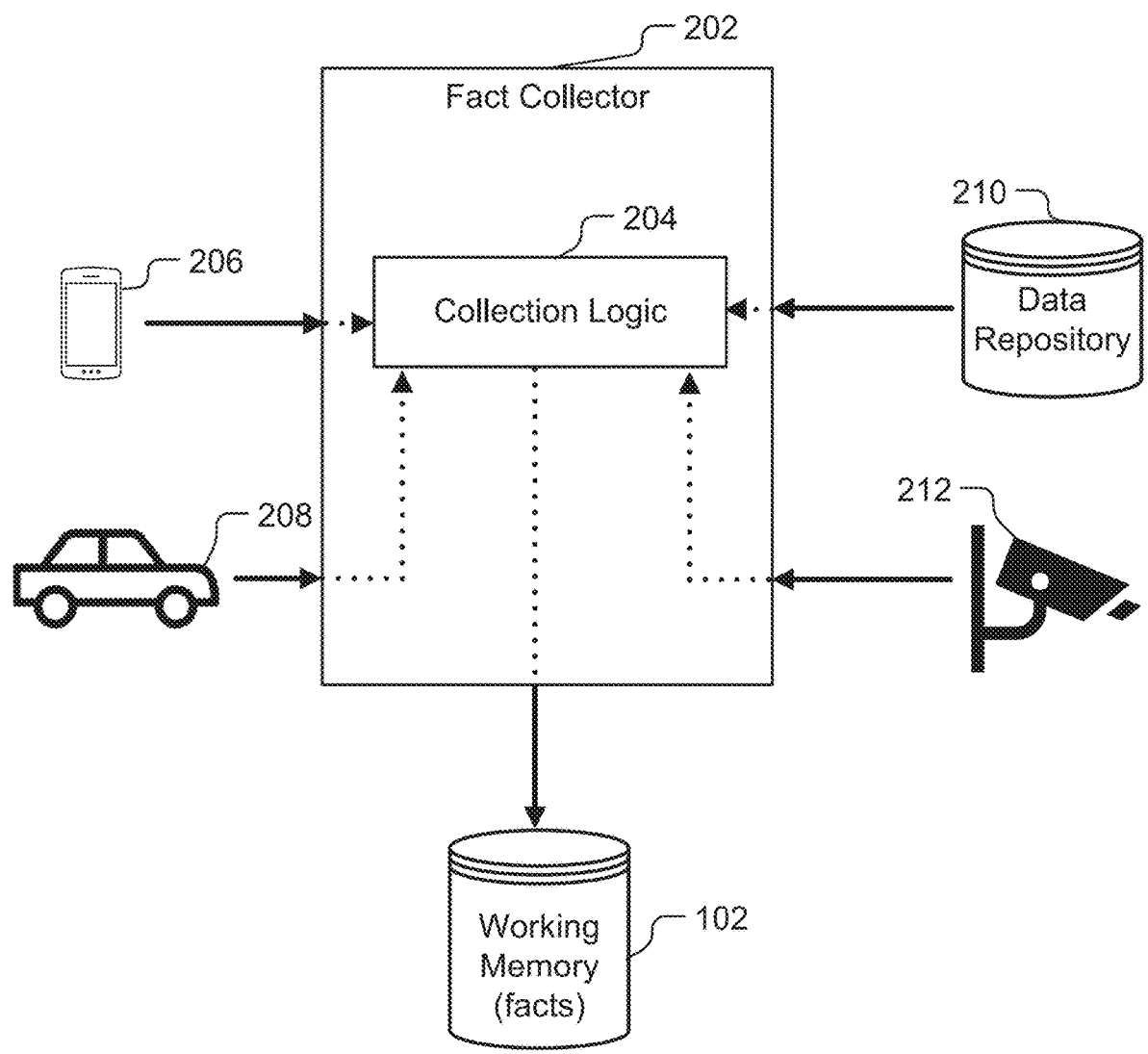
FIG. 2 is a block diagram that illustrates an example of collecting facts to be stored in a working memory and accessed by a decision engine.

FIG. 2 is a block diagram that illustrates an example of collecting facts to be stored in a working memory and accessed by a decision engine.

Specifically, FIG. 2 illustrates an example environment 200 in which a fact collector 202 collects facts from various sources. Collection logic 204 of the fact collector 202 can be implemented to collect the various facts from the various sources and store the facts in a coherent manner in the working memory 102 so that the decision engine 106 can implement pattern matching using the pattern matcher 108. Facts can be collected from various sources including, but not limited to, a user device 206 (e.g., a smart phone or tablet) that can include an interface to the virtual assistant, a vehicle 208 that can also include an interface to the virtual assistant, an external data repository 210, such as a calendar of a user of the user device 206 or a user of the vehicle 208, and one or more cameras 212. The user device 206 and the vehicle 208 can include various sensors that provide the facts to the collection logic 204. For example, the user device 206 and the vehicle 208 can provide facts related to geographic coordinates (e.g., position, elevation, moving direction and speed) as well as facts related to environmental conditions such as temperature, noise level, acceleration, deacceleration, applications, etc. Further, the vehicle 208 can include facts related to any aspect of the vehicle including facts related to a video feed obtained from cameras within or outside the vehicle. Additional examples of facts that can be obtained from the vehicle (or other user device) can include (i) speed of the vehicle, (ii) temperature within the vehicle, (iii) HVAC conditions and settings within the vehicle, (iv) multimedia playback and implementation in the vehicle, (v) identification of a user of the vehicle based on face recognition, voice recognition, other biometric recognition, key fob recognition, and recognition of other electronic or non-electronic devices, (vi) scheduling and/or calendar information obtained by the vehicle 208 or other devices, (vii) contact information (e.g., birthdays) obtained by the vehicle 208 or other devices, (viii) information obtained from an email account of the user, as obtained by the vehicle 208 or other devices, (ix) measurements of levels of components of the vehicle, such as fluid level, wear and tear, etc., (x) the status of various components of the vehicle, such as doors locked/unlocked, window up/down, transmission gear, parking break on/off, door(s) open/closed/ajar, trunk open/closed/ajar, moonroof open/closed, tire pressure, engine status, etc., (xi) destination information, (xii) past behavior of the user, (xiii) predicted future behavior of the user, (xiv) fingerprint information, (xv) ambient light information, (xvi) breath analysis information.

The facts obtained from the one or more cameras 212 can be obtained from cameras that are located at a user's residence (e.g., a video enabled doorbell), cameras that are located on devices of the user (e.g., a smart phone), cameras that are located at other authorized locations of the user (e.g., workplace of the user) and cameras mounted to a car such as exterior facing cameras and interior facing cameras for facial recognition or gesture recognition.

The collection logic 204 can be capable of synthesizing the various types of facts obtained from the various components providing the facts. For example, the collection logic 204 can deduce from information provided from one of the cameras (e.g., a video feed from the camera or additional information obtained from the camera related to information that is in the video feed) that the user is leaving their residence and heading to their vehicle 208. The collection logic 204 can also obtain an identification of the user from a camera located on the vehicle 208. Further, the collection logic 204 can then safely identify a particular user using the facts recently obtained from the camera of the vehicle 208 and the camera 212 at the residence of the user. Based on the identification of the user, the collection logic 204 can obtain calendar information related to the identified user from the data repository 210, all before the user is able to open the door of their vehicle 208. These synthesized facts can be stored in the working memory 102 for matching with various rules by the pattern matcher 108. Alternatively, raw (unsynthesized) facts can be collected by the collection logic 204 and stored in the working memory 102.

Figure 3:
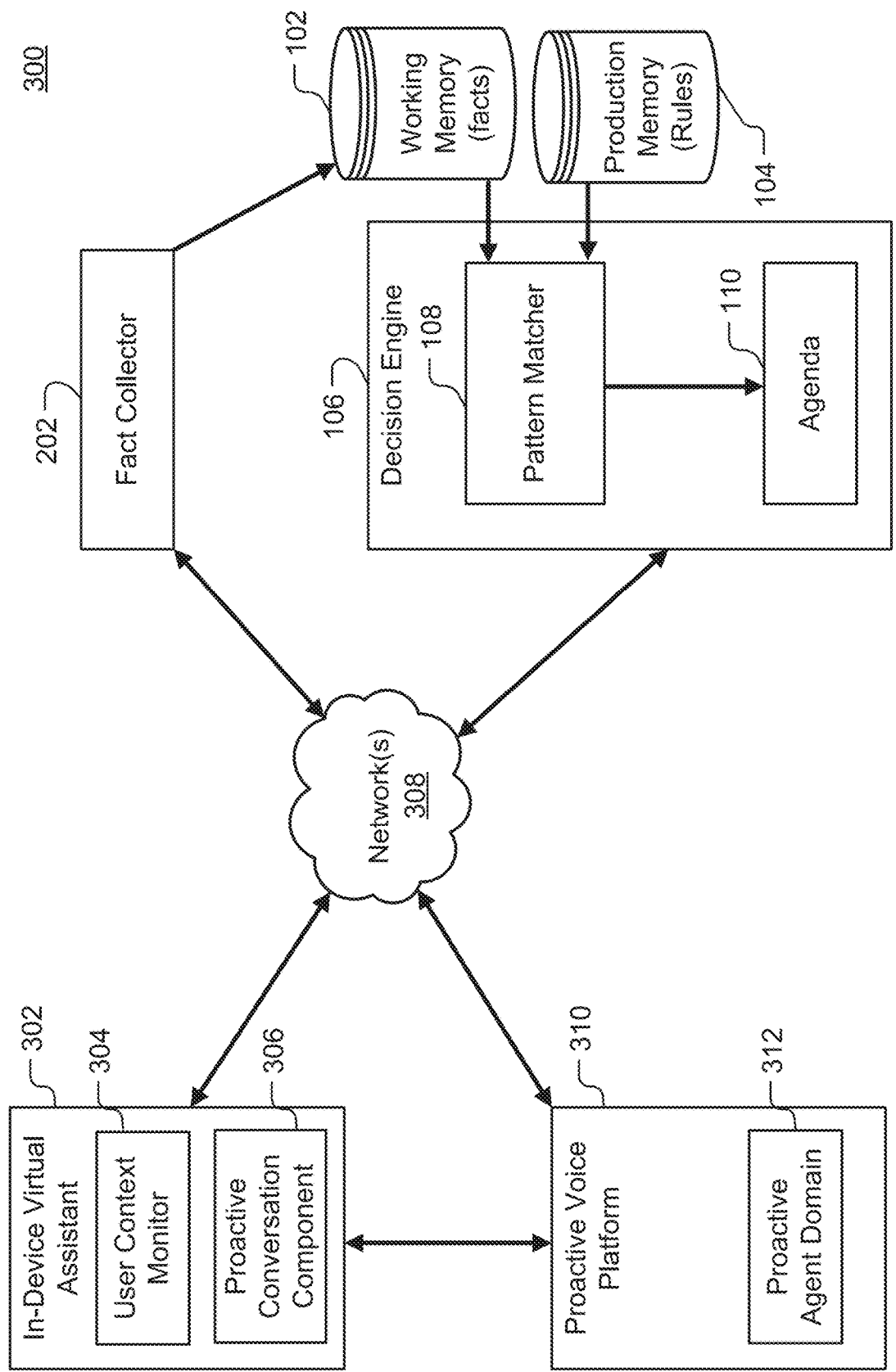
FIG. 3 illustrates a diagram of an example environment in which a proactive virtual assistant can be implemented.

FIG. 3 illustrates a diagram of an example environment in which a proactive virtual assistant can be implemented.

Specifically, FIG. 3 illustrates an environment 300 that includes the working memory 102, the production memory 104, the decision engine 106, the pattern matcher 108, the agenda 110 and the fact collector 202 as discussed above with reference to FIGS. 1 and 2. The environment 300 also includes an in-device virtual assistant 302, which incudes a user context monitor 304 and a proactive conversation component 306. The environment 300 also includes a proactive voice platform 310 that includes a proactive agent domain 312. The environment 300 also includes one or more network(s) 308 that allow each of the components of the environment 300 to communicate with one another.

For example, the in-device virtual assistant 302 and the proactive voice platform 310 can be local in the vehicle 208 and can communicate with each other on a network 308 within the vehicle 208. The vehicle 208 could be connected to servers in the cloud using a network 308 that allows information to be exchanged to/from servers in the cloud hosting the fact collector 202, the decision engine 106, the working memory 102 and the production memory 104. For example, the "proactive virtual assistant" and the "virtual assistant" described in this document can be understood as a collection of software components in a system that can be distributed across a client device (e.g., a vehicle 208) and servers in the cloud.

Alternatively, each of the in-device virtual assistant 302, the proactive voice platform 310, the fact collector 202, the decision engine 106, the working memory 102 and the production memory 104 can be located within the vehicle 208 (or any other device used by the user). In another embodiment, local (e.g., in vehicle 208) implementations of the in-device virtual assistant 302, the proactive voice platform 310, the fact collector 202, the decision engine 106, the working memory 102 and the production memory 104 can be utilized along with cloud implementations of the in-device virtual assistant 302, the proactive voice platform 310, the fact collector 202, the decision engine 106, the working memory 102 and the production memory 104. Various combinations of local and cloud implementations can be utilized to provide the proactive virtual assistant. Proactive virtual assistant technology can include some or all of the components illustrated in FIG. 3 and the technology disclosed can also be referring to other components not illustrated in FIG. 3.

Figure 4:
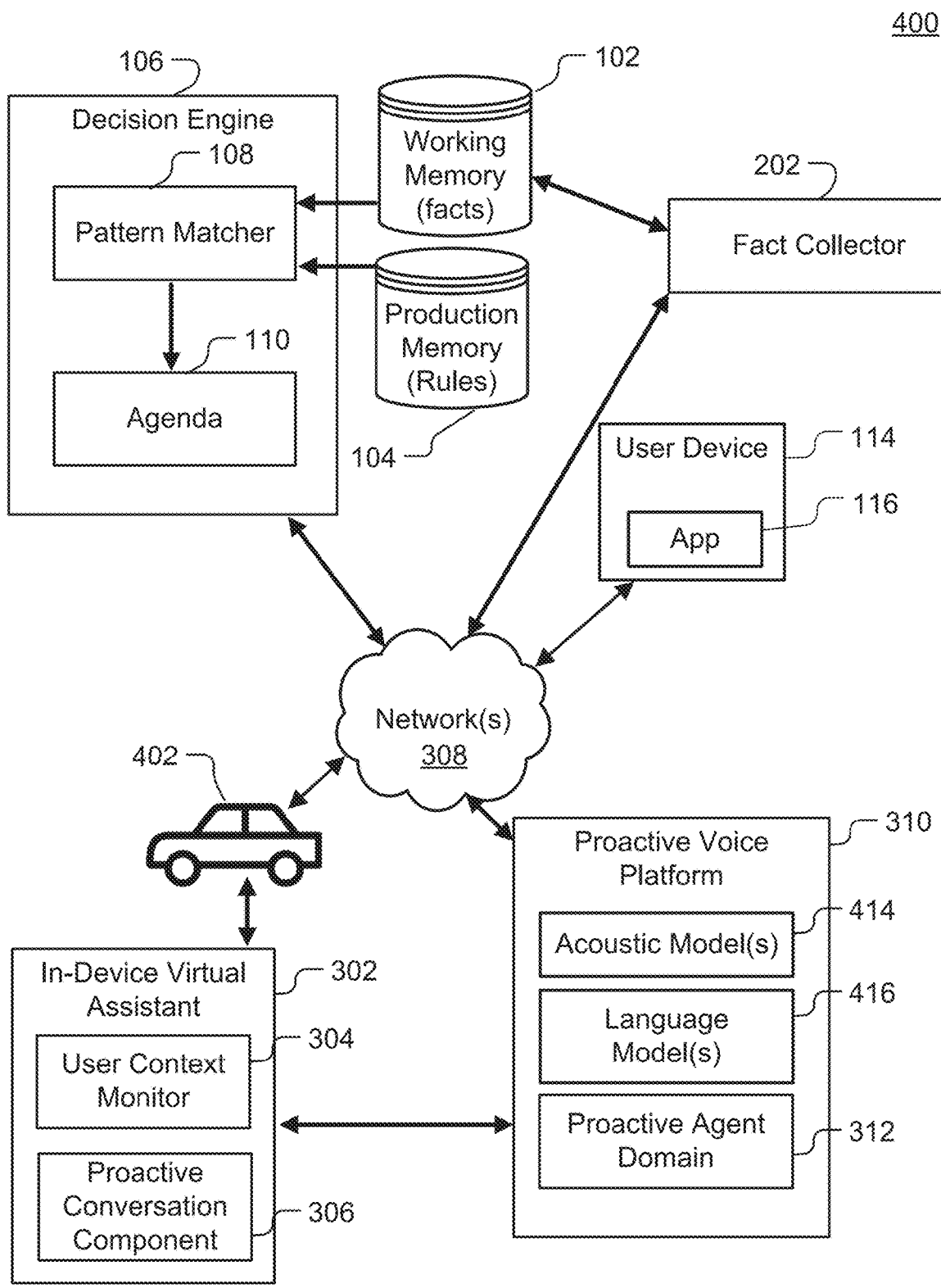
FIG. 4 illustrates a diagram of an example environment in which a proactive virtual assistant can be implemented.

FIG. 4 illustrates a diagram of an example environment in which a proactive virtual assistant can be implemented.

Specifically, FIG. 4 illustrates an environment 400 that includes the working memory 102, the production memory 104, the decision engine, 106, the pattern matcher 108, the agenda 110, the user device 114, the fact collector 202, the vehicle 402, the in-device virtual assistant 302, the user context monitor 304, the proactive conversation component 306, the network(s) 308, the proactive voice platform 310 and the proactive agent domain 312 as discussed above with reference to FIGS. 1-3. Therefore, redundant descriptions of these elements are omitted.

As discussed above, some or all of the in-device virtual assistant 302 can be located in the vehicle 402. Some or all of the proactive voice platform 310 can also be located in the vehicle or it can be in the cloud and connected to the network(s) 308 (or other networks) in order to communicate to the vehicle 402. For example, the in-device virtual assistant 302 and/or the proactive voice platform 310 can be a single computing device, a cloud computing device or a combination of a local computing device(s), cloud computing devices, etc., that are capable of communicating with each other to perform the various tasks required to support proactive conversations between the virtual assistant 302 and the user. Additionally, just like the vehicle 208, the user device 114 can include the in-device virtual assistant 302 which communicates to the proactive voice platform 310.

The vehicle 402, the user device 114 and the proactive voice platform 310 each include memory for storage of data and software applications, a processor for accessing data in executing applications, and components that facilitate communication over the network(s) 308.

The proactive voice platform 310 can includes acoustic model(s) 414, language model(s) 416 and the proactive agent domain 312. The acoustic model(s) 414 can output phonemes and/or sound tokens from received audio. The language model(s) 416 can create a transcription of received speech audio. The language model(s) 416 can be single stage or multiple stage models that add an application of separate linguistic analysis. For example, the acoustic model(s) 414 can process received speech audio to infer phonemes. These phonemes can be passed to the language model(s) 416 that segment sequences of phonemes and compute scores for transcription hypotheses. The language model(s) 416 can use statistical language models to recognize statistically likely sequences of words.

The proactive agent domain 312 can act as a natural language domain that applies semantic analysis to the transcription of the received speech audio by putting context and meaning to the transcription. Further, the proactive agent domain 312 can be configured to facilitate a conversation that is implemented according to a conversation schema that is specified or identified by an action component of a satisfied rule. For example, the proactive agent domain 312 can be configured to carry out the conversation schema based on information received from the virtual assistant 302 as well as information received from other components of the environment, such as the decision engine 106, the working memory 102, the production memory 104, the fact collector 202, the user device 114 and the vehicle 402. The subject matter of the conversation to be initiated according to the conversation schema can be determined according to the condition component of the satisfied rule, the action component of the identified rule and/or one or more detected facts. The proactive initiating of the conversation with the user according to the conversation schema specified or identified by the action component of the satisfied rule is discussed in more detail below with reference to FIG. 5.

The decision engine 106 has the ability to begin the process of initiating the conversation with the user by communicating with, for example, the proactive conversation component 306 of the in-device virtual assistant 302 if and when a rule is satisfied. The user (of the vehicle 402) will have the ability to decline or interrupt the in-device virtual assistant 302 during a conversation. The virtual assistant 302 can determine an appropriate time to proactively start a new conversation with the user. For example, if the user is speaking on their mobile device or if the user is speaking to another occupant of, for example, the vehicle 402, the virtual assistant 302 can wait for the occupant conversation to end. Different types of new conversations can have different priorities such that an urgent new conversation can have a priority such that the virtual assistant 302 will not wait for the occupant conversation to finish and will "interrupt" the occupant conversation to initiate the new conversation.

In an implementation, direct initiation of a conversation from the proactive voice platform 310 to the in-device virtual assistant 302 can be prohibited for security reasons. In this implementation, the in-device virtual assistant 302 must initiate the conversation after being notified by the decision engine 106 that a rule is satisfied. Once the rule is satisfied the virtual assistant 302 and the proactive voice platform 310 (controlled by the proactive agent domain 312) can carry out the conversation schema specified or identified by the action component of the satisfied rule.

In an implementation, the user context monitor 304 of the in-device virtual assistant 302 sends context information (facts) to the fact collector 202 for storage in the working memory 102. The decision engine 106 is constantly monitoring the facts stored in the working memory 102 to determine whether condition components of one or more rules are satisfied. When a rule is satisfied by the facts, the decision engine 106 can communicate to the proactive conversation component 306 of the virtual assistant 302. In other words, the in-device virtual assistant 302 receives notification that a new conversation should be initiated as a result of the rule being satisfied.

Next, the proactive conversation component 306 of the virtual assistant 302 initiates the conversation schema by transmitting a query to the proactive agent domain 312 of the proactive voice platform 310. Throughout this document several operations are describe as being carried out by the proactive agent domain 312 and the proactive voice platform 310. The operations caried out by these entities, as describe herein, can be carried out by other entities as well. For example, when referring to the proactive agent domain 312 and a particular operation, the particular operation can actually be carried out by other components of the proactive voice platform 310 or other components of the overall environment 400.

In addition to the query received from the proactive conversation component 306, the proactive voice platform 310 can receive, additional request information from the virtual assistant 302 and it can receive additional information regarding the facts and the satisfied rule(s) from the decision engine 106. Then the proactive voice platform 310, using the proactive agent domain 312, can provide "new conversation" information to the proactive conversation component 306 of the virtual assistant 302. Using the "new conversation" information, the proactive conversation component 306 of the virtual assistant 302 can carry out the conversation schema to communicate to the user in spoken word, written form or any other type of medium by which to convey information (e.g., haptic). In response to the new conversation, the user can provide an answer or feedback to the virtual assistant 302. After receiving the answer or feedback from the user, the virtual assistant 302 can initiate, for example, activating a motor or component of the user device, such as a smart phone or a vehicle. The communications between the decision engine 106, the vehicle 208, the in-device virtual assistant 302, the proactive voice platform 310 and the user device 114 over the network(s) 308 can be performed using HTTP/TLS using, for example a WebSocket API.

Figure 5:
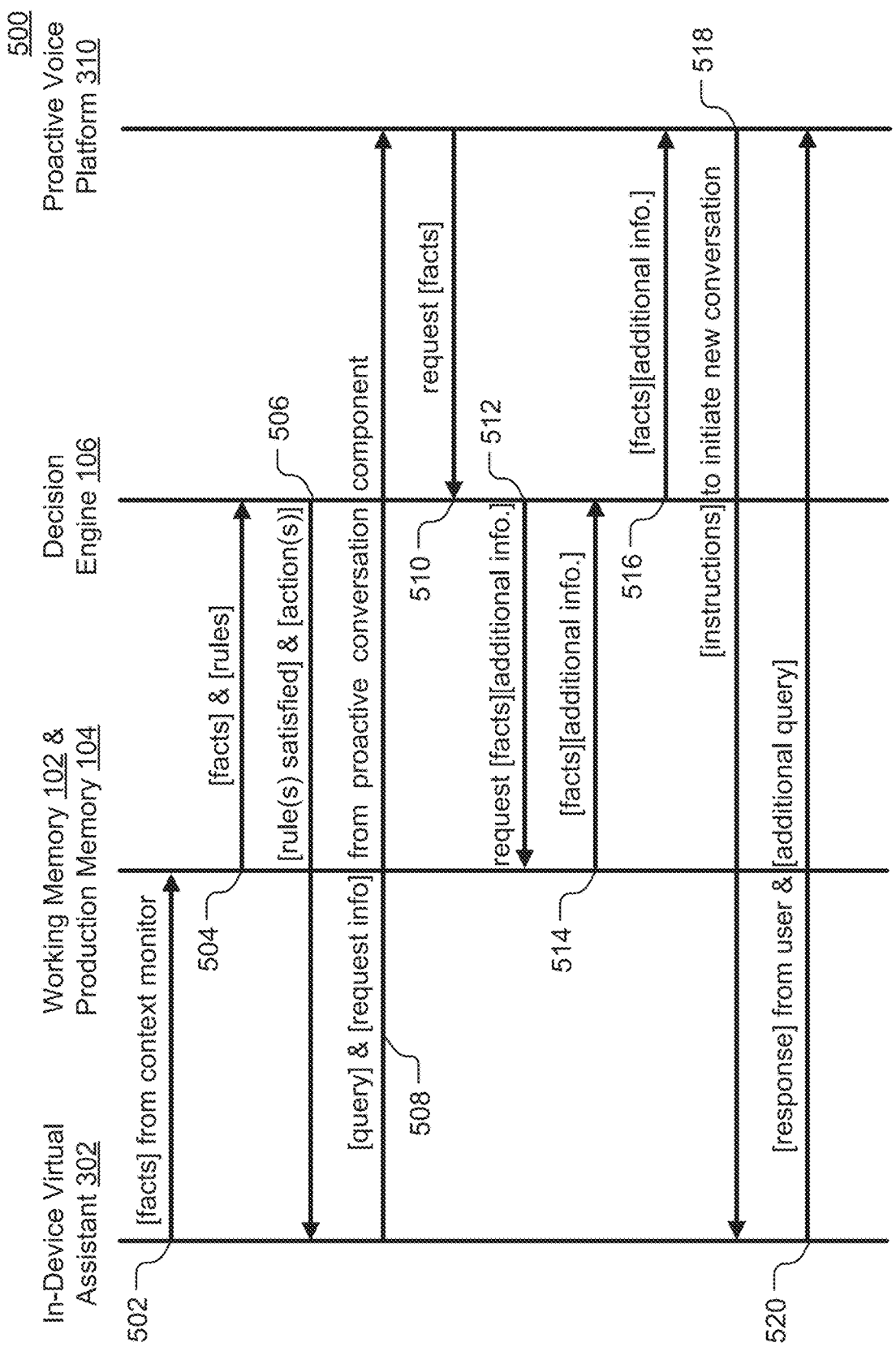
FIG. 5 illustrates a data exchange between the various components of a proactive virtual assistant.

FIG. 5 illustrates a data exchange between the various components of a proactive virtual assistant.

Specifically, FIG. 5 illustrates a data exchange 500 between the components of the proactive virtual assistant (e.g., the components of the environments 100, 200, 300 and 400 of FIGS. 1-4). In operation 502 the user context monitor 304 of the virtual assistant 302 transmits facts to the working memory 102. These facts, as discuss above, can be collected from various sensor and data repositories. The facts can be actively sent to the working memory 102 or they can be actively collected by the fact collector 202 at, for example, the direction of the proactive agent domain 312. In operation 504 the decision engine 106 obtains the facts and rules from the working memory 102 and the production memory 104. In operation 504, the decision engine can be constantly monitoring the working memory 102 and the production memory 104 to apply the facts to the rules for pattern matching. Alternatively, upon the storage of a new fact in the working memory 102, the decision engine 106 can be notified, such that the decision engine 106 can apply pattern matching using the new fact. Other methods and mechanisms for getting the facts and rules to the decision engine from the working memory 102 and the production memory 104 will be apparent to a person skilled in the art.

At operation 506 the decision engine 106, upon a determination that one or more rules are satisfied according to the facts, can transmit information to the virtual assistant 302 to indicate that one or more rules have been satisfied and that certain actions should be performed. As described above, with reference to FIG. 4, the pattern matcher 108 can find one or more rules that "match" or are satisfied by one more facts. In other words, the condition components of rules are satisfied and action components of the satisfied rules should be performed. As discussed above with reference to FIG. 4, a conversation schema can be specified or identified by the action component of the satisfied rule. Operations 506, 508, 510, 512, 514, 516, 518 and 520 are performed as being part of the conversation schema specified or identified by the action component of the satisfied rule.

As also discussed above, the agenda 110 of the decision engine 106 can resolve conflicting rules (or actions) and can prioritize which actions should be performed first. Once these determinations are made by the pattern matcher 108 and the agenda 110 of the decision engine 106, the decision engine 106 provides information to the virtual assistant 302 to inform the virtual assistant 302 that certain actions regarding a proactive new conversation should be performed by the virtual assistant 302. As illustrated in FIG. 5, the information received by the virtual assistant 302 in operation 506 can include one or more rules that are satisfied as well as one or more actions to be performed according to the conversation schema.

In response to receiving the rule(s) and action(s) from the decision engine 106, according to operation 508 the proactive conversation component 306 of the virtual assistant 302 prepares and sends a query (e.g., a text query) and optional request information to the proactive voice platform 310. Specifically, the query and the optional request information is sent to the proactive agent domain 312 of the proactive voice platform 310. Note that the proactive agent domain 312 can be configured or defined by a manufacturer of the user device 114 or the vehicle 208. For example, if the manufacturer of the vehicle is Lucid, then Lucid can configure the proactive agent domain 312 to initiate a customized proactive new conversation based on facts and rules that are also defined by and/or specific to Lucid. The proactive agent domain 312 can be customized (as mentioned above) or it can be generic based on, for example, a category of the vehicle 208 or user device 114.

Upon receiving the query and optional request information, the proactive voice platform 310 can, in operation 510, request additional facts from the decision engine 106 (or from the virtual assistant 302—not illustrated). Further, in operation 512 the decision engine 106 can request facts from the working memory 102 or other sources, such as those discussed above with reference to FIG. 2 (e.g., the data repository 210, the one or more cameras 212, etc.) to obtain additional information, such as historical conversation information, persistent data set by the user of the vehicle 208, etc.

In operation 514 the requested facts (and/or other information) are transmitted to or obtained by the decision engine 106 and in operation 516 the requested facts (or other information) are transmitted to or obtained by the proactive voice platform 310 (e.g., the proactive agent domain 312 of the proactive voice platform 310).

Based on the query and the optional request information obtained by the proactive voice platform 310 in operation 508 and based on additional (and optional) facts or other information obtained by the proactive voice platform 310 in operation 516, the proactive voice platform 310 can provide instructions to the virtual assistant 302 to proactively initiate a new conversation with the user of the vehicle 208. As discussed above, prior to actually proactively initiating the new conversation with the user of the vehicle 208, the proactive conversation component 306 of the virtual assistant 302 can check to make sure that quiet mode is not enabled (e.g., check to make sure that QuietMode=false). If quiet mode is not enabled, then the virtual assistant 302 will initiate a new conversation with the user that is not solicited by the user. If quiet mode is enabled, then the virtual assistant 302 can decide to initiate a new conversation only in written form on a display without outputting synthesized speech audio to the user. Alternatively, the virtual assistant 302 can decide to not engage with the user at all if quiet mode is enabled. The instructions to initiate the new conversation received by the virtual assistant 302 in operation 518 can include sufficient information for the virtual assistant 302 to initiate the new conversation (e.g., the instructions to initiate the new conversation are sufficient so that the virtual assistant 302 knows what to say or display). Note that the instructions in operation 518 can include the entire set of words or phrases to convey to the user in written or spoken form or the instructions can include information that is sufficient for the proactive conversation component 306 to determine what to convey in spoken or written form. For example, the instructions can include text of an answer in (i) written form (e.g., "Please enter 12") for display, (ii) auditory form (e.g., "Please enter twelve"), and/or (iii) some structured data, such as Java Script Object Notation (JSON) (e.g., {"command":"ask_for_number", "expected": 12}) that can allow customizable formatting of the answer by the virtual assistant 302. As mentioned above, the written form is for display and the auditory form is for Text-to-Speech voice synthesis, which can be more explicit with words and avoid initialisms/abbreviations, digits etc., in order to ease the burden for performing the text-to-speech synthesis. The structured data can be of other types that will be apparent to a person skilled in the art. For example, the structured data can be speech synthesis markup language (SSML) and/or some extension of SSML (e.g., <speak><emphasis> please enter <say-as interpret-as="number">12</say as></emphasis></speak>).

Eventually, a response to the new conversation will be conveyed by the user of the vehicle 208 and in operation 520 the response (even a silent response by the user) will be conveyed to the proactive voice platform 310 along with an optional query or additional information to carry out the engagement between the user of the vehicle 208 and the virtual assistant 302.

As discussed above, some of the above-describe operations described with reference to FIG. 5 can take place locally (e.g., on the vehicle 208 or other device used by the user) and some of the operations can take place in the cloud. Furthermore, there can be two or more modes of operation of the system that provides the proactive virtual assistant. For example, if remote network connectivity is not available, a "local" version of the system can be implemented on the vehicle 208 itself to provide a rudimentary implementation of the proactive virtual assistant. However, when remote connectivity is available, a "full" version of the system can be implemented using both components that are local to the vehicle 208 and using components that are in the cloud.

Example Implementations

Several examples of specific implementations of the proactive virtual assistant are provided below. Some of these examples are proactive conversations and some of these examples are reactive conversations that can collect information that can later be used for a proactive conversation. For example, historical conversation data resulting from reactive virtual assistant interactions can be analysed and used for future proactive virtual assistant interactions. These examples are in no way limiting but are provided below to demonstrate the capabilities of the system that implements the proactive virtual assistant and to describe example data flows between various components of the system that implements the proactive virtual assistant. Further, any examples that identify an automotive manufacturer just identify a particular manufacturer for the sake of demonstrating that an automotive manufacturer could implement a proactive virtual assistant.

General Vehicle Example. In one example, the in-device virtual assistant 302 is located in the vehicle 208 (e.g., in the head unit of the vehicle 208) and the user is the driver of the vehicle 208. The proactive agent domain 312 is a custom domain that will respond to various conversations with the user as designed and customized by, for example, the manufacturer of the vehicle 208. At the direction of the decision engine 106 and the virtual assistant 302, the proactive agent domain 312 can proactively initiate the conversation with the user using the in-device virtual assistant 302 before the user speaks to the in-device virtual assistant 302 of the vehicle 208.

As discussed above with reference to FIG. 5, to proactively start a new conversation with the user, in response to the decision engine 106 determining that a "rule" has been satisfied, the proactive conversation component 306 can send a text query to the proactive voice platform 310 with the text "proactive_agent_start_conversation". Additionally, the proactive conversation component 306 can send additional parameters (e.g., "request information") that are specifically used and understood by the proactive agent domain 312. These additional parameters can be customized by the manufacturer of the vehicle 208 and can be used, along with other conversation history, additional facts from the working memory 102 and other persistent data to enable the proactive agent domain 312 to decide how to start the conversation with the user.

User Controlling Experience. In an implementation, the technology disclosed allows the user to control the experience. For example, after the proactive virtual assistant 302 initiates a conversation or even before the proactive virtual assistant 302 initiates a conversation with the user, the user can say "stop bothering me" and the proactive agent domain 312 can set a persistent flag "QuietMode=true" in a user profile that is associated with the user of the vehicle 208. The persistent flag regarding "QuietMode" can be locally stored in the virtual assistant 302 within the vehicle 208, it can be stored in the working memory 102 or it can be stored in any other memory of the system that implements the proactive virtual assistant.

The user of the vehicle can be identified using one or more cameras, the key fob of the user, other biometric information, such as the user's voice. Since the user of the vehicle 208 is identified, the persistent flag can be set to "QuietMode=true" just for that particular user and not for all users of the vehicle 208. If the user does not have a profile, a guest profile can be created for the particular user. There can be many guest profiles, each one being associated with a particular user using images of the guest user obtained from the one or more cameras or other biometric information, such as the user's voice. After the persistent flag is set to "QuietMode=true" the in-device virtual assistant 302 (at the direction of the proactive voice platform 310) can provide a written response on a display, such as "Ok! I will not bug you anymore. To turn me back on just say 'you can talk to me again'" or it can provide a spoken response, such as "Ok, sorry!".

User Entering Vehicle. In another implementation, the user context monitor 304 can detect that the user has just entered the vehicle 208 and provide one or more facts to the fact collector 202 that indicate that the user has entered the vehicle 208. One of the facts that is provided can be information that identifies the user and that indicates that the user has just entered the vehicle 208 (a weight sensor indicating that the user has sat on a particular seat, such as the driver's seat). The decision engine 106 will use the pattern matcher 108, the facts from the working memory 102, the rules from the production memory 104 to determine that a particular rule is satisfied and then use the agenda 110 to resolve any conflicts and prioritize rules if multiple rules are satisfied. The proactive conversation component 306 can then send a query to the proactive voice platform 310 (or more specifically, the proactive agent domain 312 of the proactive voice platform 310), such as "manufacturer_agent_start_conversation" with additional request information, such as "ManufacturerAgentParameters→DriverDoorIsOpen=true".

Close Vehicle Door. The proactive agent domain 312 can then communicate to the proactive conversation component 306 of the virtual assistant 302 to start a conversation that welcomes the user to the vehicle 208 and reminds the user that the driver's side door is still open. For example, the proactive conversation initiated by the virtual assistant 302 (at the direction of the proactive voice platform 310) could be "Good morning Lillian! I haven't seen you for a few days. I hope you are feeling well. Would you like me to close the door?" Lillian, could then say, "yes please." The in-device virtual assistant 302 would then monitor the status of the door and provide dynamic responses based on collected facts and the same communications loop described above with reference to FIGS. 4 and 5. The response from Lillian can be processed by the proactive conversation component 306 or it can be sent to the proactive voice platform 310 for processing and future action or response by the proactive voice platform 310 and/or the proactive conversation component 306. For example, the in-device virtual assistant 302 could (i) determine that the door is starting to close and say "Closing the door. Please be careful", (ii) determine that the door was not successfully closed and say "Hmm, something went wrong! I was not able to close the door" or (iii) determine that the door was already closed and say "Seems like you beat me to it! Thank you!".

Time for Lunch. In another implementation, the technology disclosed can use historical facts to determine a time when Lillian might typically drive to lunch and use current facts, such as the current time, to determine that the current time is approximately the time that Lillian usually goes to lunch. Upon identification of Lillian and her entry into the vehicle 208, the in-device virtual assistant 302, using the same communications loop described above, can proactively initiate a conversation and say "Hi Lillian. It is almost lunch time. Would you like me to recommend a place to get lunch around here?" If Lillian provides a positive response, the in-device virtual assistant 302 can send a query to the proactive voice platform 310 to obtain a list of restaurants. The in-device virtual assistant 302 can then speak or display a list of nearby restaurants sorted by rating after receiving a response from the proactive voice platform 310.

Unrecognized User. In an implementation, if a user gets into the vehicle 208 and the user is not recognized, then the in-device virtual assistant 302, using the communications loop described above, can say "Hello! I don't think we have met before. My name is Hound. What is your name?" The user can than say their name, "Hallie." The in-device virtual assistant 302 can then say "wonderful. Nice to meet you, Hallie."

End of Workday. Further, in another example of using historical facts and current facts, the in-device virtual assistant 302 can determine that it is about the time that Lillian finishes her workday. Using the communications loop described above, the in-device virtual assistant 302 can say "Hello Lillian! I hope you had a dice day at work. Should I navigate you back home." Lillian could reply "No, I want to go to the airport." The in-device virtual assistant 302 could then determine, using calendar information from the data repository 210, that Lillian's mother is flying into San Francisco Airport and communicate "Navigating to San Francisco Airport, is this where you want to go?"

Upcoming Appointment. In another implementation, upon identification of the fact that Lillian has entered the vehicle 208, the in-device virtual assistant 302 can send a query to the proactive agent domain 312 to check if Lillian has any appointments. Using the facts from the working memory 102 or other locations and the rules from the production memory 104, the decision engine 106 can determine that Lillian has an appointment in Santa Clara in 45 minutes. The proactive agent domain 312 can instruct the proactive conversation component 306 of the in-device virtual assistant 302 to proactively state "Hello Lillian! Your calendar shows you have a meeting in 45 minutes in Santa Clara. Shall I navigate you?" If Lillian provides a positive answer, the in-device virtual assistant 302 will initiate navigation to the address identified in Lillian's calendar.

Proactively Starting A Conversation With Unknown User—Hounda. In some of these examples, Hounda is the manufacturer of the vehicle 208 and the proactive agent domain 312 is an agent domain that could be configured by Hounda. Upon a determination by the decision engine 106 that a rule is satisfied and upon the virtual assistant 302 receiving an indication from the decision engine 106 that the rule is satisfied (e.g., see operations 502 and 504 of FIG. 5). The proactive conversation component 306 sends text query "hounda_agent_start_conversation" to the Hounda agent domain 312 and also sends RequestInfo→HoundaAgentParameters→UserID=12345 to the Hounda agent domain 312. UserID 12345 is a new User ID. The in-device virtual assistant 302 also sets ignore=0, which turns off quite mode so that the virtual assistant 302 can interact with the user. At the instruction of the Hounda agent domain 312, the in-device virtual assistant 302 initiates a new conversation as "Good morning. My name is Hound. What is your name?" The in-device virtual assistant 302 can set Auto-listen=true/IVI screen prompt/Client stores response for later. Auto-listen allows the in-device virtual assistant 302 to continue to listen for a user's response to a query and IVI screen prompt keeps the query on a screen for viewing by the user, thus making it easier for the user to respond to the query. The in-device virtual assistant 302 can store the name of the new user to use in later responses (e.g., greeting the user by name proactively when the user gets into the car again).

If the user responds with "open the windows" (as opposed to providing their name) the proactive voice platform 310 can respond with an OpenWindowCommand after receiving a text query and/or additional information from the virtual assistant 302. If the user responds with "Lillian" the proactive voice platform 310 can respond with a WelcomeUserCommand, which results in the virtual assistant 302 saying "Hello Lillian." If the user responds with silence, the in-device virtual assistant 302 can repeat the question or do nothing. Further, if silence is detected the in-device virtual assistant 302 can say "Ok, looks like you're busy. I'll be quiet for now."

Proactive Welcome—Getting Into Vehicle—Hounda. This describes an in-depth user flow for initially getting into the vehicle. The user flow starts after the user has opened the door (manually or automatically) and sits down in the driver's seat. After the decision engine 106 determines that a "getting into vehicle" rule is satisfied, the virtual assistant 302 sends, to the proactive agent domain 312, (i) a text query "hounda_agent_door" if (!door closed and driver sitting) and (ii) RequestInfo→HoundaAgentParameters→DoorAction= "open"|"close". This logic will only send the text query if the door is not closed and the DoorAction RequestInfo parameter is sent. The "DoorAction" sent by the virtual assistant 302 indicates which response the proactive voice platform 310 should return (e.g., "Do you want to close the door?" or "Do you want to open the door?"). The virtual assistant 302 can state "Do you want to close the door?"

If the user says "Yes", these dynamic responses can be received or provided by the virtual assistant 302: (i) ClientActionHappeningResult: "Please be careful as I close the door", (ii) ClientActionSucceededResult: "Closed the door", (iii) ClientActionFailedResult: "Something went wrong! I was not able to close the door", and (iv) DoorAlreadyClosedResult: "The door is already closed." All of these responses (i)-(iv) can be received or provided by the virtual assistant 302 and the virtual assistant 302 can then select the appropriate response based on current circumstances. The virtual assistant 302 uses the ClientActionHappeningResult response right before closing the door, then chooses the appropriate response after attempting to close the door.

If the user says "No", the virtual assistant 302 can say "Ok, please close the door when you are ready."

Storing User ID. The virtual assistant 302 sends (to the proactive voice platform 310) (i) a text query "hounda_agent_start_conversation" and (ii) RequestInfo→HoundaAgentParameters→Users=[{ID: 12345, driver: true}]. This virtual assistant 302 generated user data will be stored in user data storage in associated with a user's name.

Face Recognition. Upon recognition of a user's face, the virtual assistant 302 can implement the following logic: if (quiet_mode) {do nothing;} else {generate_greeting(UserID, CurrentTime, TimeZone, DriverDoorIsOpen, . . . )}. Some greeting examples after recognizing a user's face include (i) "Welcome back, <name>. I hope you are doing well", (ii) "Good morning/afternoon/evening, <name>", (iii) "Good to see you, <name>" and (iv) if the driver hasn't listened to the tutorial, prompt to listen to tutorial (see below).

If the user's face is not recognized, some example greeting exchanges can include virtual assistant 302: "Good morning/afternoon/evening. My name is Hound. What is your name?"; user: "John"; virtual assistant 302: "Nice to meet you, John. John, would you like to listen to my tutorial?"; if user says: "Yes" then the tutorial will start as described below; if user says "No" then virtual assistant 302 states: "Ok, no problem. If you want to listen to my tutorial, just say 'Ok Hound, tell me about yourself.'"

At any point during the welcome greeting described above, if the user ignores a prompt twice, then the virtual assistant 302 will be quiet. If the virtual assistant 302 decides to be quiet, the virtual assistant 302 can state: "Ok, I will keep quiet for now. If you want to talk with me, please say 'Ok, Hound, you can talk to me again.'"

Tutorial. The tutorial can be suggested by the virtual assistant 302 using logic: "if (!listen_tutorial) {tutorial_prompt; listen_tutorial=true;}", where tutorial_prompt is "Would you like to listen to my tutorial?" and listen_tutorial is an attribute stored in the virtual assistant 302, the proactive voice platform 310, or elsewhere. The virtual assistant 302 can set tutorial_mode=true. Example content of the tutorial can include the virtual assistant stating: "My name is Hound To wake me up, first say 'Ok, Hound. Then, you can ask me questions on many topics, such as how to navigate to places, what's the weather like, and playing music. You can also ask me about your vehicle, such as how much gas is left, and you can control the vehicle, such as turning on the air conditioning and opening or closing the windows and doors. Would you like to try it out?"

If the user states "Yes" then the following can exchange can take place. The virtual assistant 302 states "Say: Ok, Hound. Open the driver window." If the user says "Ok, Hound. Open the driver window.", then the virtual assistant 302 sends, to the proactive voice platform 310, (i) text query "hounda_agent_tutorial" and (ii) RequestInfo→HoundaAgentParameters→ShowTutorialShowTutorialPhraseNumber=1. Further, during the tutorial the virtual assistant 302 can state "Say: Ok, Hound. How much gas is left?" If the user says "Ok, Hound. How much gas is left?", then the virtual assistant 302 sends, to the proactive voice platform 310, (i) text query "hounda_agent_tutorial" and (ii) RequestInfo→HoundaAgentParameters→ShowTutorialPhraseNumber=2.

During the tutorial, the virtual assistant 302 can state "Say: Ok, Hound. Navigate to the nearest coffee shop." If the user says "Ok, Hound. Navigate to the nearest coffee shop.", then the virtual assistant 302 sends, to the proactive voice platform 310, (i) text query "hounda_agent_tutorial" and (ii) RequestInfo→HoundaAgentParameters→ShowTutorialPhraseNumber=3. During the tutorial, the virtual assistant 302 can also state "Say: "Ok, Hound. Cancel navigation." If the user says "Ok, Hound. Cancel navigation.", then the virtual assistant 302 sends, to the proactive voice platform 310, (i) text query "hounda_agent_tutorial" and (ii) RequestInfo→HoundaAgentParameters→ShowTutorialPhraseNumber=4. Additionally, during the tutorial, the virtual assistant 302 can state "Say: Ok, Hound. Play Hey Jude by the Beatles." If the user says "Ok, Hound. Play Hey Jude by the Beatles.", then the virtual assistant 302 sends, to the proactive voice platform 310, (i) text query "hounda_agent_tutorial" and (ii) RequestInfo→HoundaAgentParameters→ShowTutorialPhraseNumber=5. During the tutorial, the virtual assistant 302 can state "Say: Ok, Hound. Stop the music." If the user states "No", then the virtual assistant 302 can reply "Ok. If you want to listen to this tutorial again, please say 'Ok, Hound tell me about yourself'".

If the virtual assistant 302 hears silence as a result of a request, or if the virtual assistant 302 does not understand the user after the user repeats themselves 2 or 3 times in a row, then the virtual assistant 302 can say "I'm still learning. If you need help, just say 'Ok Hound, help' at any time" and then the virtual assistant 302 can set tutorial_mode=false to be persistently stored.

Calendar—Schedule. Assuming calendar access from, for example, the data repository 210 discussed above with reference to FIG. 2, the virtual assistant 302 can send (i) text query "hounda_agent_show_schedule", (ii) RequestInfo→HoundaAgentParameters→Schedule= {"meetings": [{"title": "Hounda Discussion", "start_time": 1477062000, "end_time": 1477065600, "attendees": [{ID: 1111, first_name: "Keyvan"}, { . . . }], location: "Sound-Hound office"}]}, and (iii) RequestInfo→HoundaAgentParameters→Users=[{ID: 12345, name: "John"}]. Further, after receiving a response to the information sent from the virtual assistant 302 to the proactive voice platform 310, the virtual assistant 302 can state, for example, (i) "John, here is today's schedule" (Display weather and schedule on screen) and (ii) "It looks like you have the event 'hiking with friends' coming up. Would you like me to navigate to <location>?" If the user states "Yes", then the virtual assistant 302 can state "Ok. Navigating to <location>. It will take about <x> time to get there." If the user states "No", then the virtual assistant 302 can state "Ok, no problem."

Calendar—No Schedule. Assuming calendar access from, for example, the data repository 210 discussed above with reference to FIG. 2, the virtual assistant 302 can send (i) text query "hounda_agent_show_schedule", (ii) RequestInfo→HoundaAgentParameters→Schedule={ } and (iii) RequestInfo→HoundaAgentParameters→Users=[{ID: 12345, driver: true, first_name: "John"}]. If there is no schedule for the day, the virtual assistant 302 can state (i) "John, I don't have your schedule today. Where would you like to go?" or (ii) "Your schedule is clear today. Where would you like to go?"

Recognized User and Have Work Address. Assuming the virtual assistant 302 recognizes the user and the virtual assistant 302 has access to the user's work address. If the user states "I want to go to work", then the virtual assistant 302 can state "Navigating to work at <address>".

Recognized user and Do Not Have Work Address. Assuming the virtual assistant 302 recognizes the user but does not have access to the user's work address. If the user states "I want to go to work", then the virtual assistant can state "I don't know where work is, can you give me the address?" The user could then state "5400 Betsy Ross Drive, Santa Clara" and the virtual assistant 302 would then state "Navigating to 5400 Betsy Ross Drive in Santa Clara".

Start Engine. Virtual assistant 302 instructions: if (navigation==true) {start_engine; if (!seatbelt_buckled) {prompt_buckle_seatbelt;} else if (driver_buckled==true) {prompt_start_engine;}, where prompt_buckle_seatbelt="Please buckle your seatbelt before driving" and prompt_start_engine="Would you like to start the engine?"

For prompt_start_engine, the virtual assistant 302 sends, to the proactive voice platform 310, (i) text query "hounda_agent_start_engine" and (ii) RequestInfo→HoundaAgentParameters→Users=[{ID: 12345, driver: true, first_name: "John"}]. Further, the virtual assistant 302 states "John, would you like to start the engine?". If the user states "Yes", then some dynamic responses by the virtual assistant 302 can include: (i) ClientActionSucceededResult: "Turning on the engine", (ii) ClientActionFailedResult: "Couldn't turn on the engine" and (iii) EngineAlreadyOnResult: "Engine already on." If the user states "No", then that virtual assistant 302 can state "Ok, no problem."

Music—Facial Expression Recognized. Assuming that a facial expression of the user is recognized during music playback. If the recognized facial expression is a smile, then the virtual assistant 302 can retrieve metadata (e.g., artist name) for the song through a music service or music domain. While the song is still playing the virtual assistant 302 can request additional information regarding the song by sending, to the proactive voice platform 310, a text query "what artists are similar to <artist>". After obtaining similar artists, the virtual assistant 302 can take the top 3 artists and send a text query "top songs by <artist>" for each of the 3 artists. The virtual assistant 302 can then compile and present the list of the top songs by each of the 3 artists.

The following is an example of the queries sent by the virtual assistant 302 as a result of detecting the user smiling during the song. After (or before) the song finishes, the virtual assistant 302 sends text query "hounda_agent_face_expression" along with RequestInfo→HoundaAgentParameters→Users=[{ID: 12345, driver: true, FaceExpression: "happy", first_name: "John"}]. Here, the virtual assistant 302 is sending user data, including facial expression information, and an indication of whether or not the user is driving. The virtual assistant 302 can also send RequestInfo→HoundaAgentParameters→TrackPlayed={title: "Piano Man", artist: "Billy Joel", album: "Piano Man" }. This is the track that was just played. The virtual assistant 302 can send RequestInfo→HoundaAgentParameters→TrackRecommended={[{"title": "Young Turks", artist: "Rod Stewart"}, {"title": "Your Song", "artist": "Elton John"}, . . . ]}. These are the tracks that were compiled by the virtual assistant 302 with the above text queries and now are being sent to the proactive agent domain 312 of the proactive voice platform 310 as recommended songs. The virtual assistant 302 can state "John, that was a great song, wasn't it? Did you like this song?" If the user states "Yes", then the virtual assistant 302 can state "The song is Piano Man by Billy Joel and was released in 1998. Some similar songs by genre are "Young Turks" by Rod Stewart and "Your Song" by Elton John. Would you like to hear these songs?" If the user states "Yes", then the virtual assistant 302 can state "Ok, playing "Young Turks" by Rod Stewart" and then proceed to play the song. If the user states "No", then the virtual assistant can state "Ok, no problem". If the user does not respond to the inquiry by the virtual assistant 302 (e.g., the virtual assistant 302 detects silence from the user), then the virtual assistant 302 can state "I'm sorry, I didn't hear anything! You can ask me to 'play a song' if you would like to hear another song."

If the recognized facial expression is a frown, then the virtual assistant 302 can send a text query "hounda_agent_face_expression" (once per song as soon as the frown is detected) and also send RequestInfo→HoundaAgentParameters→Users=[{ID: 12345, driver: true, FaceExpression: "sad", first_name: "John" }]. The virtual assistant 302 can also state "John, it looks like you don't like this song. Would you like me to play a different type of song?" If the user states "Yes", then the virtual assistant 302 can state "Ok, playing another song" and proceed to play a different song. If the user states "No", then the virtual assistant can state "Ok, no problem" and continue to play the current song. If the virtual assistant 302 detects silence from the user in response to the questions, then the virtual assistant 302 can state "I'm sorry, I didn't hear anything!" The proactive voice platform 310 can send ClientSilentAudioCommand with no responses, so that the virtual assistant 302 can insert a response.

Navigation—Wrong Address. In this example, the user requests navigation to an address, but the address is incorrectly identified. The user states, "Ok Hound, I'd like to navigate to <x>" and the virtual assistant 302 states "Ok, navigating to <y>." The user then states "Ok Hound, no, I want to navigate to <x>!" The virtual assistant then states "I'm sorry, I will navigate to <x>. Is this correct?" If the user responds "Yes", then the virtual assistant 302 states "Ok, navigating to <x>". Alternatively, if the user responds "No", then the virtual assistant 302 states "I'm so sorry that I don't understand. Please try again."

Navigation—Bad Traffic. In this example, the virtual assistant 302 is currently navigating the user to a destination and bad traffic has been detected. This can be done by detecting a bad traffic event on a roadway along the navigated route. If the user does not have a scheduled appointment at the destination, the virtual assistant 302 can send, to the proactive voice platform 310, a text query "hounda_agent_traffic" along with RequestInfo→HoundaAgentParameters→Users=[{ID: 12345, driver: true, first_name: "John"}]. After receiving a response from the proactive voice platform 310, the virtual assistant 302 can state "John, there is bad traffic on the usual route this morning. I found a route that is 5 minutes shorter. Shall I use this route?" If the user responds with "Yes", then the virtual assistant 302 can state "Ok, navigating a different route." If the user responds with "No", then the virtual assistant 302 can respond with "Ok, continuing on the same route."

Alternatively, if the user does have a scheduled appointment at the destination, and the minimum remaining travel time will extend beyond the time of the beginning of the appointment such that the user will arrive late to their destination, the virtual assistant 302 still sends, to the proactive voice platform 310, a text request "hounda_agent_traffic" and RequestInfo→HoundaAgentParameters→Users=[{ID: 12345, driver: true, first_name: "John"}]. After receiving a response from the proactive voice platform 310, the virtual assistant 302 can identify another individual scheduled to participate in the appointment and state "John, there is bad traffic on the route today. It will take XXX minutes to your office, and you will be late for your meeting with Tom. Would you like to send an SMS to Tom?" If the user responds with "Yes", then the virtual assistant 302 will state "Ok, what's your message?" and then notify the individual regarding the late arrival. However, if the user responds with "No", then the virtual assistant 302 will state "Ok, no problem." If the user responds with "No, thanks. I'd like to call Tom", then the virtual assistant 302 can state "Ok, calling Tom." If the user responds with silence, then the virtual assistant 302 will state "I'm sorry, I didn't hear anything! Can you say that again?" If there is further silence from the user, the virtual assistant 302 will state "Ok, I will be quiet now. If you want to talk with me, please say "Ok, Hound, you can talk to me again."

Driving on Highway. In this example, the vehicle has entered the highway and the virtual assistant 302 detects that (i) the vehicle has entered the highway, (ii) the speed of the vehicle is above a certain threshold, such as 60 miles per hour (100 kilometers per hour), and (iii) adaptive cruise control and lane assist is an available feature on the vehicle. In this circumstance, the virtual assistant 302 can send, to the proactive voice platform 310, a text request "hounda_agent_enter_freeway" and RequestInfo→HoundaAgentParameters→Users=[{ID: 12345, driver: true, first_name: "John"}]. After receiving a response from the proactive voice platform 310, the virtual assistant 302 can state "John, do you want to set adaptive cruise control and turn lane assistance on?" If the user responds with "What is that?", "What are those functions?", "What do those do?", or "What does that mean?" In response the virtual assistant 302 can state "adaptive cruise control will automatically drive at a constant speed while keeping a safe distance from the car in front. Lane assistance recognizes the lane boundaries and automatically keeps the car within the lane." After providing the explanation, the virtual assistant 302 can state "Do you want to set Adaptive Cruise Control and Lane Keep Assistance on?" If the user responds with "Yes", then the virtual assistant 302 will state "Ok, turning on adaptive cruise control and lane assistance." However, if the user states "No", then the virtual assistant 302 will state "Ok, no problem."

Leaving Vehicle. In this example, the following facts are detected: vehicle speed=0; parking brake=true; shift position="P"; seatbelt=false; and engine="off". Based on the following facts, the virtual assistant 302 sends, to the proactive voice platform 310, a text query "hounda_agent_leave_conversation" and also checks the user's schedule using RequestInfo→HoundaAgentParameters→Schedule={"meetings": [{"title": "meeting 1", "start_time": 1477062000, "endtime": 1477065600}, {"title": "meeting 2" ... }]} and RequestInfo→HoundaAgentParameters→Users=[{ID: 12345, first_name: "John"}]. After receiving a response from the proactive voice platform 310, the virtual assistant 302 can state "Goodbye, John. Thank you for driving. You should leave home at 7:00 am tomorrow morning according to your schedule. Would you like to open the door?" If there is no schedule, the virtual assistant 302 can state "Goodbye, John. Thank you for driving. Would you like to open the door?" If the user responds with "Yes", then the following dynamic responses can be stated by the virtual assistant 302: (i) ClientActionHappeningResult: "Please be careful as I open the door", (ii) ClientActionSucceededResult: "Opened the door", (iii) ClientActionFailedResult: "Something went wrong! I was not able to open the door. Please push the door open switch" and (iv) DoorAlreadyOpenedResult: "The door is already open." If the user responds with "No", then the virtual assistant 302 can state "Ok, no problem."

Cabin Temperature. This example can be used with the phrase "it's too hot" or "it's too cold." For example, if the user states "Ok Hound, it's too hot" the virtual assistant can send, to the proactive voice platform 310, RequestInfo→CarStatus→CurrentTemperature=degrees, in order to determine the current temperature within the vehicle. The virtual assistant 302 can then state "Setting the temperature to XXX degrees" (current temperature minus 10 degrees) and set the cabin fan of the vehicle to "auto" mode. The virtual assistant 302 can then respond with the following dynamic responses: (i) ClientActionSucceededResult: "Setting the temperature to XXX degrees", (ii) ClientActionFailedResult: "Couldn't set the temperature" and (iii) TemperatureAtMaxColdResult: "Temperature already at max cold temperature." Once the temperature reaches target temperature, the virtual assistant 302 can send, to the proactive voice platform 310, a text query "hounda_agent_climate" and RequestInfo→CarStatus→CurrentTemperature=degrees. The virtual assistant 302 can then state "Is this a comfortable temperature?" If the user responds with "Yes", then the virtual assistant 302 can state "I'm glad you like it." However, if the user responds with "No", then the virtual assistant 302 can state "Ok, I'm sorry. Would you like it hotter or colder?" If the user responds with "Colder", then the virtual assistant 302 can state "Ok, lowering the temperature by a few degrees."

If the user states "Ok Hound, I feel hot" or "Lower the temperature", then the virtual assistant 302 can state "Lowering the temperature by a few degrees" and then set the cabin fan to "auto" mode. The virtual assistant 302 can then respond with the following dynamic responses: (i) ClientActionSucceededResult: "Lowering the temperature by a few degrees", (ii) ClientActionFailedResult: "Couldn't lower the temperature" and (iii) TemperatureAtMaxColdResult: "Temperature already at max cold."

If the user states "Ok Hound, I feel a little bit hot" or "Lower the temperature a little bit", then the virtual assistant 302 can state "Lowering the temperature by 1 degree." The virtual assistant 302 can then respond with the following dynamic responses: (i) ClientActionSucceededResult: "Lowering the temperature by 1 degree", (ii) ClientActionFailedResult: "Couldn't lower the temperature", and (iii) TemperatureAtMaxColdResult: "Temperature already at max cold."

The virtual assistant 302 can access historical data for a particular user that includes cabin temperature setting information. The cabin temperature setting information can include temperatures previously set by the user for a variety of external temperature, sunlight and humidity conditions and for a variety of internal cabin temperature, sunlight and humidity conditions. Upon entry into the vehicle 208 the virtual assistant can identify the user and access the cabin temperature setting information that aligns with current internal and external conditions and identify a predicted temperature setting that the user might prefer. Using the communications loop described above, the virtual assistant 302 can proactively ask the user, "Do you want me to set the temperature to XX." The virtual assistant 302 can respond to the answer from the user accordingly.

Car Climate and Circulation. If the user states "Ok Hound, fan speed up", "Raise the fan speed", "Fan set level 2", "I want raise the fan speed by 2", "Lower the fan speed" or "Reduce the fan speed", then the virtual assistant 302 can state "Raising the fan speed by 2" or "Setting the fan speed at 2." If the user uses the term "a little bit", then the virtual assistant 302 can raise or lower the fan speed by 1.

If the user states "Turn on the dashboard and floor fans", then the virtual assistant 302 can provide the following dynamic responses: (i) ClientActionSucceededResult: "Setting the circulation mode to dashboard and floor", (ii) ClientActionFailedResult: "Couldn't set the circulation mode", and (iii) DashboardAndFloorCirculationModeOnResult: "Dashboard and floor circulation mode already set."

If the user states "Turn on the dashboard vent" or "Set the circulation to be dashboard only", then the virtual assistant 302 can provide the following dynamic responses: (i) ClientActionSucceededResult: "Setting the circulation mode to dashboard", (ii) ClientActionFailedResult: "Couldn't set the circulation mode" and (iii) DashboardCirculationModeOnResult: "Dashboard circulation mode already set."

If the user states "Set the mode for floor vents", then the virtual assistant 302 can provide the following dynamic responses: (i) ClientActionSucceededResult: "Setting the circulation mode to floor", (ii) ClientActionFailedResult: "Couldn't set the circulation mode" and (iii) FloorCirculationModeOnResult: "Floor circulation mode already set."

If the user states "Floor and defrost", then the virtual assistant 302 can provide the following dynamic responses: (i) ClientActionSucceededResult: "Setting the circulation mode to floor", (ii) ClientActionFailedResult: "Couldn't set the circulation mode", (iii) FloorCirculationModeOnResult: "Floor circulation mode already set", (iv) ClientActionSucceededResult: "Turning on defrost", (v) ClientActionFailedResult: "Couldn't turn on defrost" and (vi) FloorCirculationModeOnResult: "Defrost already turned on."

If the user states "I want to clean the fog off the windows," "The front window is foggy" or "I want to defrost the front/rear window", then the virtual assistant 302 can provide the following dynamic responses: (i) ClientActionSucceededResult: "Turning on front/rear defrost", (ii) ClientActionFailedResult: "Couldn't turn on front/rear defrost" and (iii) DefrostAlreadyOnResult: "Front/rear defrost already turned on."

If the user states "Set climate control to be automatic" or "Climate control auto", then the virtual assistant 302 can provide the following dynamic responses: (i) ClientActionSucceededResult: "Setting automatic Climate Control," (ii) ClientActionFailedResult: "Couldn't set Climate Control" and (iii) ClimateControlModeAutoResult: "Climate Control already set to automatic."

In a similar manner discussed above with respect to using historical data to proactively predict a temperature for the user, the virtual assistant 302 can use historical fan speed data to proactively as the user "Do you want the fan speed set to XX."

Driver Drowsiness. In this example, the virtual assistant 302 obtains driver and passenger status and determines if the driver is tired or the passenger is sleeping. If the virtual assistant 302 determines that the driver is tired (e.g., if (driver tired)), then the virtual assistant 302 sends, to the proactive voice platform 310, a text query "hounda_agent_face_expression" and RequestInfo→HoundaAgentParameters→Users=[{ID: 12345, driver: true, FaceExpression: "tired", first_name: "John" }].

In one example, after receiving a response to the text query from the proactive voice platform 310, the virtual assistant 302 can state "John, are you tired?" If the user responds with "Yes", then the virtual assistant 302 can respond by playing music (e.g., PlayMusicCommand returned). If the user responds with "No", then the virtual assistant 302 can do nothing. If there is silence in response to the question by the virtual assistant 302, then the virtual assistant can respond by playing music. If the user then responds with "Stop playing the music", then the virtual assistant 302 can stop playing musing and store user preferences accordingly.

In another example, after receiving a response to the text query from the proactive voice platform 310, the virtual assistant 302 can state "John, you look drunk, you should take a break." The virtual assistant 302 can navigate to the nearest rest stop or coffee shop by sending, to the proactive voice platform 310, a text query "what coffee shops are open within 2 miles." After receiving a response from the proactive voice platform 310, the virtual assistant 302 can state "Here are some coffee shops within 2 miles. Would you like me to navigate to the closest one?" If the user responds with "Yes", then the virtual assistant 302 can state "Ok, navigating to the closest coffee shop at <location>." If the user responds with "No", then the virtual assistant 302 can state "Ok, if you change your mind, please say 'navigate to the nearest coffee shop'."

In a further example, upon determining that the passenger is sleeping, the virtual assistant 302 can send, to the proactive voice platform 310, a text query "hounda_agent_face_expression" and RequestInfo→HoundaAgentParameters→Users=[{ID: 54321, driver: false, FaceExpression:

"sleep" }, {ID: 12345, driver: true, first_name: "John"}]. After receiving a response from the proactive voice platform 310, the virtual assistant 302 can state "John, your passenger has fallen asleep. Shall I raise the temperature by 2 degrees and lower the fan speed by 1 on the passenger side?" If the user responds with "Yes", then the virtual assistant 302 can state "Raising the temperature to XXX degrees and lowering the fan speed to YYY." However, if the user responds with "No", then the virtual assistant 302 can state "Ok, no problem."

Fuel Status. If the virtual assistant 302 detects that the fuel level has fallen below a predetermined threshold (e.g., that the fuel level is low), then the virtual assistant 302 can send, to the proactive voice platform 310, a text query "hounda_agent_car_status". The virtual assistant 302 can also store information regarding when the user was notified about the status of the fuel. Further, the virtual assistant 302 can send, to the proactive voice platform 310, RequestInfo→CarStatus→FuelStatus=miles left, in order to determine the number of miles the vehicle can travel until the fuel is empty. The virtual assistant 302 can also send, to the proactive voice platform 310, RequestInfo→CarStatus→EngineStatus=Good|Error, in order to determine the status of the engine, or whether there is an error code or other type of problem.

The virtual assistant 302 can further send, to the proactive voice platform 310, RequestInfo→HoundaAgentParameters→Users=[{ID: 12345, driver: true, first_name: "John"}], to determine one or more occupants of the vehicle.

Additionally, the virtual assistant 302 can notify the user of the level of the fuel or the fuel status when the user first enters the vehicle and also when the user interacts with the navigation system or begins driving.

In one example, the virtual assistant 302 can state "John, I'm low on fuel. Shall I find the nearest gas station?" If the user responds with "Sure, can you take me to the usual gas station?" If the virtual assistant 302 does not have a location stored (or set) for GasStationBrand, then the virtual assistant can state "What brand of gas station do you like to use?" If the user responds with "Shoal", then the virtual assistant 302 can state "Ok, setting Shoal as your usual gas station." The virtual assistant 302 can then send, to the proactive voice platform 310, a text query for "<brand> gas stations near here." If after receiving a response from the proactive voice platform 310 with several Shoal gas stations, the virtual assistant 302 can state "Ok, there are several Shoal gas stations near here." If the user responds with "Navigate to the cheapest one", "Navigate to the first one" or "Navigate to the closest one", then the virtual assistant 302 will respond with "Navigating to XXX" or "Navigating to XXX. Next time, when should I notify you the next time you should re-fuel?" For example, you can say 30 miles until empty". If the user responds with "30 miles", then the virtual assistant 302 can state "Ok, setting low fuel notification to 30 miles."

In another example, the virtual assistant 302 can state "John, I'm low on fuel. Shall I find the nearest gas station?" If the user responds with "No", then the virtual assistant 302 can state "You have less than XX miles of driving range." The virtual assistant 302 can then send, to the proactive voice platform 310, a text query "gas station near here" and state "There are 5 gas stations within 10 miles. Would you like to navigate to the nearest one?" If the user responds with "Yes", then the virtual assistant 302 can state "Navigating to XXX." However, if the user responds with "No", then the virtual assistant 302 can state "Ok, continuing on the same route."

In a further example, the virtual assistant 302 can state "John, I'm low on fuel. Shall I find the nearest gas station?" If the user responds with "How long can I drive for?", "How long until I run out of gas?", or "How much fuel do I have left?", then the virtual assistant 302 can respond with "You have about 10 miles of driving range." The virtual assistant 302 can further respond with "Shall I find the nearest gas station?" If the user responds with "Yes", then the virtual assistant 302 can state "Ok, here are several Shoal gas stations near here." However, if the user responds with "No", then the virtual assistant can state "Ok, no problem."

In a navigation example regarding fuel level, the virtual assistant 302 can send, to the proactive voice platform 310, a text query "hounda_agent_car_status" along with RequestInfo→CarStatus→FuelStatus=miles left, and RequestInfo→CarStatus→NavMilesLeft=miles (i.e., the number of miles left until destination reached), and RequestInfo→HoundaAgentParameters→Users=[{ID: 12345, first_name: "John"}]. After receiving a response from the proactive voice platform 310, the virtual assistant 302 can state "John, the amount of fuel remaining is not enough to go to the destination. Do you want to go to a gas station?" If the user responds with "No", then the virtual assistant 302 can state "Ok, continuing on the same route." However, if the user responds with "Yes", then the virtual assistant 302 can send, to the proactive voice platform 310, a text query "<brand> gas stations near here." After receiving a response from the proactive voice platform 310, the virtual assistant 302 can state "Ok, I found 7 Shoal gas stations near here. Which one would you like to navigate to?" If the user responds with "Navigate to the cheapest one", "Navigate to the first one" or "Navigate to the closest one", then the virtual assistant 302 can state "Navigating to XXX."

The virtual assistant 302 can then send, to the proactive voice platform 310, a text query "hounda_agent_navigation_ waypoint". After receiving a response from the proactive voice platform 310, the virtual assistant 302 can state "Would you like to set this as a waypoint?" If the user responds with "Yes", then the virtual assistant 302 can provide the following dynamic responses: (i) ClientActionSucceededResult: "Setting waypoint to XXX", (ii) ClientActionFailedResult: "Couldn't set the waypoint" and (iii) WaypointAlreadySetResult: "Waypoint already set" (this dynamic response is used if the virtual assistant 302 already has a waypoint set for the navigation). However, if the user responds to the question from the virtual assistant 302 with "No", then the virtual assistant 302 can state "Ok, continuing on the same route."

Vehicle Information—Driving. In these examples, all queries begin with "Ok, Hound." If the user states "Tell me the driving range", "Let me know the cruisable distance", "Let me know the distance to empty", or "How long can I drive with the remaining fuel?", etc., the virtual assistant 302 can reply "The driving range is XXX miles." If the user states "Tell me the average MPG" or "Can you tell me the average miles per gallon?", then the virtual assistant 302 can state "The current average miles per gallon is XXX." If the user states "Can you let me know the average speed?", then the virtual assistant 302 can state "The current average speed is XXX miles per hour." If the user states "Show me the driving range", "Show me the drivable distance", "Show me the cruisable distance", or "Show me the distance to empty", then the virtual assistant 302 can state "Here is the driving range" and display the driving range. If the user states "Show me the average MPG", then the virtual assistant 302 can state "Here is the average MPG" and display the average MPG. If the user states "Show me the average speed", then the virtual assistant 302 can state "Here is the average speed" and display the average speed. If the user states "Show me the current fuel economy", then the virtual assistant 302 can state "Here is the current fuel economy" and display the current fuel economy. If the user states "When is your next oil change?", the virtual assistant 302 can state "My next oil change is in XXX miles."

Vehicle Information—Settings. In these examples, all queries begin with "Ok, Hound." If the user states "Show me the audio [information] [screen]", then the virtual assistant 302 can state "Here is the audio screen" and display the audio screen. If the user states "Show me the map [screen]", then the virtual assistant 302 can state "Here is the map screen" and display the map screen. If the user states "Show me a map of Burlington", then the virtual assistant 302 can state "Here is Burlington" and display the map of Burlington. If the user states "Where am I?", then the virtual assistant 302 can state "Here is the current location in XXX" and switch to the map screen to display the current location. If the user states "Change to the radio screen" or "Show me the radio screen", then the virtual assistant 302 can change both the audio source and the screen and states "Here is the radio screen." If the user states "Change to the Spotify screen" or "Show me the Spotify screen", then the virtual assistant 302 changes both audio source and the screen and states "Here is the Spotify screen." If the user states "Change to the USB audio screen", then the virtual assistant 302 changes both the audio source and the screen and states "Here is the USB audio screen." If the user states "Show me the Phone screen", then the virtual assistant 302 states "Here is the phone screen" and displays the phone screen. If the user states "Show me the climate control screen", then the virtual assistant 302 states "Here is the climate control screen" and displays the climate control screen.

If the user states "I want to listen to USB", "I want to listen to Spotify", "I want to listen to FM", "I want to listen to AM" or "Change audio source to FM", then the virtual assistant 302 can respond with "Changing audio source to XXX." If the user states "How can I adjust the clock?" or "Can you adjust the clock?", then the virtual assistant can respond with "Ok, what is the time you would like to set?". If the user then responds with "7:32 PM", then that virtual assistant 302 can state "Ok, setting the clock to 7:32 PM." If the user states "How can I change the backlight level of the display?" or "Can you change the display brightness?", then the virtual assistant 302 can respond with "Ok, do you want it darker or brighter?" If the user responds with "Darker", then the virtual assistant 302 can state "Ok, setting the brightness to level 3" (original brightness was level 4). However, if the user responds with "The screen is too bright", then the virtual assistant 302 can state "Ok, setting the brightness to level 2" (original brightness was level 4). If the user states "Please turn up/down the volume", "Turn down the audio", "Please turn down the volume by 2", "The speakers are too loud", "The sound is too soft", or "I cannot hear the audio very well", then the virtual assistant 302 can state "Setting the volume to level XXX."

Vehicle Information—Manual. In these examples, as all queries begin with "Ok, Hound." If the user states "What is the horsepower of this car?", then the virtual assistant 302 can state "This car has XXX horsepower." If the user states "What is that warning light?" or "I can see a warning light", then the virtual assistant 302 can state "That is XXX." If the warning light is critical, then that virtual assistant 302 can send, to the proactive voice platform 310, a text query "hounda_agent_car_status", along with RequestInfo→CarStatus→EngineStatus=Error and RequestInfo→CarStatus→CriticalWarning=true|false."}].

After receiving a response from the proactive voice platform 310, the virtual assistant 302 can state "Please have XXX checked out. Do you want to call the dealer?" If the user responds with "Yes", then the virtual assistant 302 can state "Calling the Hounda dealer nearest you" and begin to call the nearest Hounda dealer. However, if the user responds with "What should I do?" or "Should I go to the dealer?", then the virtual assistant 302 can state <Solutions for XXX> or "No, you don't need to go to the dealer. Please have it checked at the next service appointment."

If the user states "Let me know the AC commands", "Show me the AC commands", "I want to know the AC commands", "Climate control commands", or "Show me how to control the AC/climate", then the virtual assistant 302 can state "Here are some examples" (short response) and also show some examples on the screen. Alternatively, the virtual assistant 302 can respond with "Examples include 'Set the temperature to 70 degrees', 'Set Climate Control to be automatic', or 'Raise the temperature a little bit.'" If the user states "How can I set the destination?", the virtual assistant 302 can stat "You can navigate to a destination by saying an address, business name, or category. Examples include 'Navigate to 5400 Betsy Ross Drive in Santa Clara Calif.' or 'Navigate to the nearest gas station.'" If the user states "What is the size of the engine?", then the virtual assistant 302 can state "My engine size is 1.5 L."

Schedule. If the user states "What's my schedule today?", then the virtual assistant 302 can state "Here is your schedule" and also display the schedule on the screen. If the user then states "Thank you", the virtual assistant 302 can respond with "You're welcome."

If the user states "What's my next meeting?", then the virtual assistant 302 can send schedule request to, for example, the proactive voice platform 310 as RequestInfo→HoundaAgentParameters→Schedule={"meetings": [{"title": "Hounda Discussion", "start_time": 1477062000, "end_time": 1477065600, "attendees": [{ID: 1111, first_ name: "Keyvan"}, { . . . }], location: "SoundHound office"}]}."}]. After receiving a response from the proactive voice platform 310, the virtual assistant 302 can state "Your next meeting is "Hounda Discussion" with Keyvan at the SoundHound office starting at 3 PM." The user can then respond with "Thank you" and the virtual assistant 302 can state "You're welcome."

If the user states "What's my weekend schedule?", then the virtual assistant 302 can sent, to the proactive voice platform 310, a text query "hounda_agent_hotel_reservation" along with RequestInfo→HoundaAgentParameters→Schedule={"day": "weekend", "meetings": [{"title": "Vacation", "time": " ", "attendees": "Keyvan", location: "San Francisco, California" }]}. After receiving a response from the proactive voice platform 310, the virtual assistant 302 can state "I see on your schedule that you will be traveling to San Francisco this weekend. Would you like to reserve a hotel?" In response, the user could state "Yes, I want to find hotels in SF for this weekend" and the virtual assistant 302 could proceed to work with the user to book a hotel room. If the user responds with "No", then the virtual assistant 302 could stat "Ok, enjoy your trip!" If the user responds with "Later" or "I'll reserve a hotel later" or "I'll reserve one later", then the virtual assistant can send, to the proactive voice platform 310, a text query "hounda_agent_add_reminder" along with RequestInfo→HoundaAgentParameters→Reminders={[{"name": "HotelReserve", "written_response": "Reserve a Hotel"}]}.

The reminder mentioned above can be read by the virtual assistant 302 when the user enters the vehicle. For example, the virtual assistant 302 can state "Next time you get in the car, shall I remind you to reserve a hotel?" If the user responds with "Yes", then the virtual assistant 302 can state "Ok, setting a reminder to reserve a hotel when you get in the car next time." However, if the user responds with "No", then the virtual assistant 302 can state "Ok, no problem."

Network Connectivity. If the vehicle is disconnected from the network, locally stored custom domains can be implemented to capture user intent and then re-send requests (with audio) once the network connectivity has been restored.

For example, if the user states User: "Ok, Hound, what is the weather?" and there is no network connectivity, the virtual assistant 302 can respond with "I'm sorry, I cannot access the network right now. Would you like me to try later?" If the user states "Yes", then the virtual assistant 302 can state "Saving the query for later" and save the audio spoken by the user for sending after the network connectivity has been restored. If the user states "No", then the virtual assistant 302 can state "Ok, no problem."

When the network connectivity is restored, the virtual assistant 302 can implement the instructions "while (!empty (query_queue))" to takes a query off the query_queue and send the audio query to the proactive voice platform 310. After sending the audio query to the proactive voice platform 310 can receive a response. If the received response is a NoResultCommand response from the proactive voice platform 310, there are 3 different example options. In the first option, the virtual assistant 302 sends, to the proactive voice platform 310, a text query "network_recovery_connection_query" along with RequestInfo→Network→QuerySucceeded=false and the virtual assistant 302 states "Skipping the {second, third, fourth} query <plays audio> because it returned no results." In the second option, the virtual assistant 302 handles sending feedback to user through the display by displaying a total number of queries (e.g., "You have 5 queued queries" and displaying the number of skipped queries). In the third option the virtual assistant 302 remains silent and just skips to the next query.

The virtual assistant 302 can send, to the proactive voice platform 310, a text query "network_recovery_connection_query" along with RequestInfo→Network→QueryQueueNumber=number. This is the queue number tracked by the virtual assistant 302 for a given query, which is used in the response back from the proactive voice platform 310 to tell the user which number query this is (first, second, third, fourth, etc.). The virtual assistant 302 can also send, to the proactive voice platform 310, RequestInfo→Network→QuerySucceeded=true and if (first_query), then the virtual assistant 302 can state "The network has reconnected. Would you like me to replay your queries?" If the user states "Yes", then the virtual assistant 302 can state "The first query is: <plays audio>." If the user responds with "No", then the virtual assistant 302 can state "Ok, no problem" and discard the response and empties the queue.

Further, the virtual assistant 302 can state "Would you like to continue?" If the user responds with "Yes", then the virtual assistant 302 can state "The {second, third, fourth, . . . } query is: <plays audio>".

Misrecognition. For example, suppose the virtual assistant 302 states "XXX" and then the user states "Ok, Hound, that's not what I meant" or "Ok Hound, that's not correct." The virtual assistant can respond with "I'm so sorry. Could you please say that again?"

In another example, suppose the virtual assistant 302 receives NoResultCommand from the proactive voice platform 310 because a phrase was not recognized by the proactive voice platform 310. The virtual assistant 302 can state "I'm sorry, I didn't get that! Can you please say that again?"

In a further example, supposed the virtual assistant 302 receives NoResultCommand from the proactive voice platform 310 because a phrase was not recognized. The virtual assistant 302 can state "I'm sorry, I didn't get that! Could you try saying that in a different way?"

Figure 6:
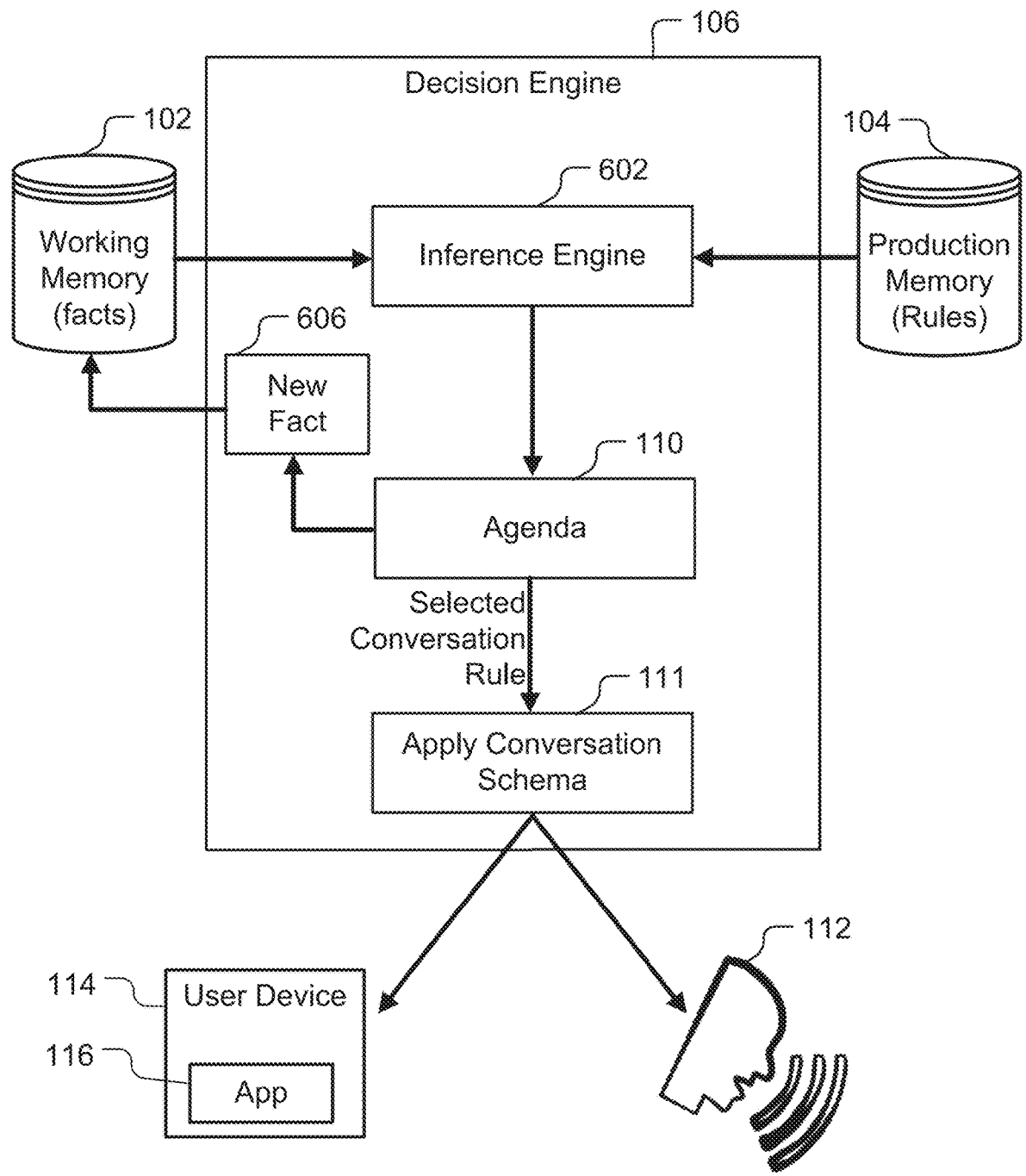
FIG. 6 illustrates an example environment in which a proactive virtual assistant can be implemented using an inference engine capable of forward chaining.

FIG. 6 illustrates an example environment 600 in which a proactive virtual assistant can be implemented using an inference engine capable of forward chaining.

FIG. 6 is similar to FIG. 1 with respect to the working memory 102, the production memory 104, the agenda 110, applying the conversation schema 111, the speech conversation 112, and the user device 114 running the application 116. Therefore, redundant descriptions thereof are omitted in this description of FIG. 6. However, FIG. 6 is different from FIG. 1 in that the decision engine 106 includes an inference engine 602 that is capable of, at least, forward chaining.

Generally, an inference engine 602 can operate in two different modes, forward chaining and backward chaining. In this example, the inference engine 602 is operating in a forward chaining mode. Forward chaining starts with the known facts from the working memory 102 and eventually asserts a new fact 606. More specifically, in order for the inference engine 602 to implement forward chaining, the action component of the rule should also include adding the new fact 606 to the working memory 102 of facts. In terms of a forward chaining inference engine 602, the act of adding a new fact 606 can be referred to as a deductive step. Rules that have a deductive step as the action component can be referred to as a deduction rule. Other rules, such as those discussed above with reference to FIG. 1, in which the action component does not include a deductive step can be referred to as a conversation rule. Note that in a deductive step, the new fact 606 is deduced from the currently available facts in the working memory 102 and then the new fact 606 added to the working memory 106. This deductive step can be done repeatedly, creating deductive chains (forward chains).

Referring to FIG. 6, the inference engine 602 can identify the rules from the production memory 104 to which the facts from the working memory 102 apply. The inference engine 602 can use various algorithms known to those who are skilled in the art, such as a "Rete Algorithm" to identify the rules from the production memory 104 to which the facts from the working memory 102 apply (see Wikipedia article on Rete algorithm). Just like FIG. 1, the identified rules are provided to the agenda 110 and the agenda selects the best rule to be applied. If the rule selected by the agenda 110 is a conversation rule in which the action component does not include a deductive step, then the conversation schema is applied as discussed above with respect to FIG. 1. FIG. 6 illustrates the agenda 110 selecting a conversation rule and passing it to logic for conversation schema 111 which applies a conversation schema for performing speech conversation 112 or for performing a non-speech conversation on a screen of the user device 114. In a similar manner as discussed above with reference to FIG. 1, the conversation schema can include various types of data exchanges between the virtual assistant 302, the inference engine 602, and the proactive voice platform 310. The data exchanges described throughout this document apply to the conversation schema described here with reference to FIG. 6. Furthermore, FIG. 6 illustrates the agenda 110 selecting a deduction rule and generating the new fact 606 and then providing the new fact to the working memory 102. As the forward chain proceeds to repeat (i.e., multiple deduction rules are selected) additional facts 606 will continue to be added to the working memory 102. These new facts added to the working memory 102 as part of the forward chaining can, at any point, be applied to the conversation rules for initiating the speech conversation 112 or the non-speech conversation with the user device 114.

The inference engine 602 can be implemented as method of (or a system for) assisting a user. For example, using the inference engine 602, the method (or system) can include obtaining a plurality of rules having condition components and action components, wherein the rules consist of conversation rules and deductive rules, wherein the action component of a conversation rule specifies a conversation schema, and wherein the action component of a deductive rule specifies a new fact. The method (or system) can further include detecting, by a sensor, a fact related to an environment of the user, adding the fact to a working memory of facts, identifying a rule, of the plurality of rules, having a condition component that is satisfied by the working memory of facts, responsive to the identified rule being a deductive rule, creating a new fact according to the action component of the rule of the plurality of rules and adding the fact to the working memory of facts. The method (or system) can further include responsive to the identified rule of the plurality of rules being a conversation rule, initiating a conversation with the user according to a conversation schema of the action component of the identified rule, and activating a motor in response to a positive statement by the user.

Figure 7:
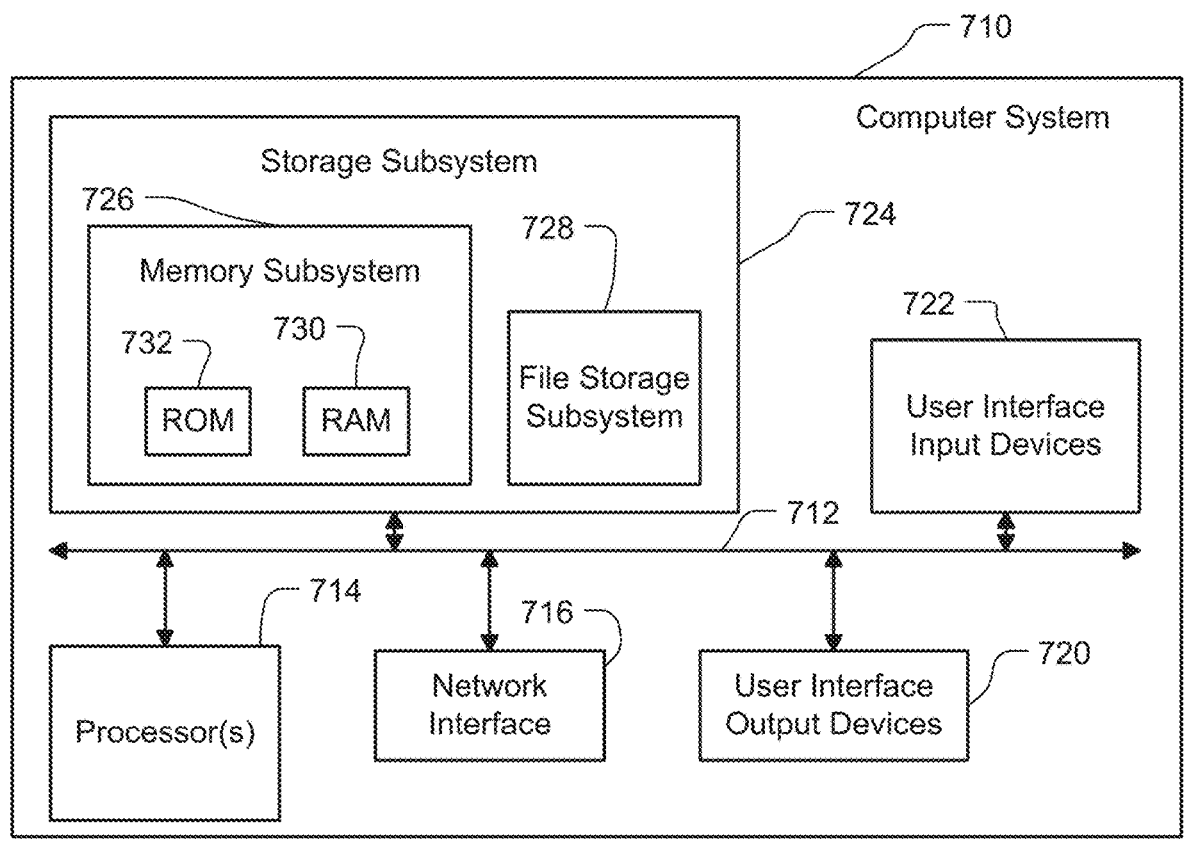
FIG. 7 is a block diagram of an example computer system that can implement various components of the environments of FIGS. 1-6.

FIG. 7 is a block diagram of an example computer system that can implement various components of the environments 100, 200, 300, 400 and 600 of FIGS. 1-4 and 6. Computer system 710 typically includes at least one processor 714, which communicates with a number of peripheral devices via bus subsystem 712. These peripheral devices may include a storage subsystem 724, comprising for example memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to communication network 308, and is coupled via communication network 308 to corresponding interface devices in other computer systems.

User interface input devices 722 may include a keyboard, pointing devices such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into computer system 710 or onto communication network 308.

User interface output devices 720 may include a display subsystem or non-visual displays such as audio output devices. The display subsystem may include a flat-panel device such as a liquid crystal display (LCD), a projection device, or some other mechanism for creating a visible image. The display subsystem may also provide non-visual display such as via audio output devices such as speakers. In general, use of the term "output device" is intended to include all appropriate types of devices and ways to output information from computer system 710 to the user or to another machine or computer system.

Storage subsystem 724 stores programming and data constructs that provide the functionality of some or all of the modules described herein. These software modules are generally executed by processor 714 alone or in combination with other processors.

Memory 726 used in the storage subsystem can include a number of memories including a main random-access memory (RAM) 730 loaded with instructions that can cause one or more processors to implement actions and data during program execution and a read only memory (ROM) 732 in which fixed instructions are stored. A file storage subsystem 728 can provide persistent storage for program and data files, and may include a hard disk drive, Flash memory chip(s), or removable media cartridges. The modules implementing the functionality of certain embodiments may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative embodiments of the bus subsystem may use other types of interconnects.

Computer system 710 can be of varying types including a server, computing cluster, blade server, server farm, or any other data processing system or computing device. Due to the ever-changing nature of computers and networks, the description of computer system 710 depicted in FIG. 7 is intended only as a specific example for purposes of illustrating the various embodiments. Many other configurations of computer system 710 are possible having more or fewer components than the computer system depicted in FIG. 7.

We claim as follows:
1. A method of assisting a user, the method comprising:
obtaining a plurality of rules having condition components and action components, the action components specifying conversation schemas;
detecting, by a sensor, a fact related to an environment of the user;
identifying a rule, of the plurality of rules, having a condition component that is satisfied by the detected fact;
determining one or more parameters in dependence on at least one of the identified rule, on the detected fact and on subject matter determined in dependence on at least one of the condition component of the identified rule, an action component of the identified rule, and the detected fact;
determining whether to initiate a conversation with the user according to a conversation schema of the action component of the identified rule and according to the one or more parameters, including (i) a conversation history according to which the conversation can be initiated with the user, and (ii) persistent data according to which the conversation can be initiated with the user, the persistent data indicating whether the user has enabled a quiet mode indicator according to which a determination can be made to not initiate the conversation with the user, despite the identification of the rule;
initiating the conversation according to the conversation schema and the determined subject matter; and activating a motor in response to a positive statement by the user.

2. The method of claim 1, wherein the identifying of the rule comprises:
identifying two or more rules having respective condition components that are satisfied in dependence on the detected fact;
ranking the identified two or more rules in dependence on priority; and
selecting a rule of the identified two or more rules having a highest priority, such that a conversation schema specified by an action component of the selected rule is used to initiate the conversation with the user.

3. The method of claim 1, wherein the identifying of the rule comprises:
identifying two or more rules having respective condition components that are satisfied in dependence on the detected fact;
determining that the two or more rules are conflicting; and
applying an agenda to determine which of the conflicting rules is to be selected, such that a conversation schema specified by an action component of the selected rule is used to initiate the conversation with the user.

4. The method of claim 1, wherein the identifying of the rule comprises:
identifying two or more action components included in the identified rule;
ranking the two or more action components in dependence on priority; and
selecting an action component of the two or more action components having a highest priority, such that a conversation schema specified by the selected action component is used to initiate the conversation with the user.

5. The method of claim 1, wherein the specified conversation schema is at least one of a data structure, a script and a software component.

6. The method of claim 1, wherein the conversation is initiated with the user in a written format.

7. The method of claim 1, wherein the conversation is proactively initiated with the user without initial engagement from the user.

8. The method of claim 7, further comprising determining an appropriate time for initiating the conversation with the user and initiating the conversation with the user at the appropriate time.

9. The method of claim 1, wherein the method is performed by a virtual assistant that is at least partially included in a vehicle head unit of a vehicle.

10. The method of claim 1, wherein the conversation schema specifies initiating a new conversation with the user that provides a reminder about sensor information.

11. The method of claim 1, further comprising, in dependence on the identified rule having the condition component satisfied by the detected fact identifying an event on a roadway to be travelled by the user along a current navigation route, using the detected fact, the conversation schema and navigation information to determine that the user will arrive late to their destination because of the identified event on the roadway and initiate the conversation to ask the user whether or not to notify an individual regarding the late arrival.

12. A system including one or more processors coupled to memory, the memory loaded with computer instructions to assist a user, the computer instructions, when executed on the one or more processors, causing the one or more processors to implement actions comprising:
obtaining a plurality of rules having condition components and action components, the action components specifying conversation schemas;
detecting, by a sensor, a fact related to an environment of the user;
identifying a rule, of the plurality of rules, having a condition component that is satisfied by the detected fact;
determining one or more parameters in dependence on at least one of the identified rule, on the detected fact and on subject matter determined in dependence on at least one of the condition component of the identified rule, an action component of the identified rule, and the detected fact;
determining whether to initiate a conversation with the user according to a conversation schema of the action component of the identified rule and according to the one or more parameters, including (i) a conversation history according to which the conversation can be initiated with the user, and (ii) persistent data according to which the conversation can be initiated with the user, the persistent data indicating whether the user has enabled a quiet mode indicator according to which a determination can be made to not initiate the conversation with the user, despite the identification of the rule;
initiating the conversation according to the conversation schema and the determined subject matter; and
activating a motor in response to a positive statement by the user.

13. A method of assisting a user, the method comprising:
obtaining a plurality of rules having condition components and action components, the action components specifying conversation schemas;
detecting a fact related to the user;
identifying a rule, of the plurality of rules, having a condition component that is satisfied by the detected fact;
determining one or more parameters in dependence on at least one of the identified rule, on the detected fact and on subject matter determined in dependence on at least one of the condition component of the identified rule, an action component of the identified rule, and the detected fact;
determining whether to initiate a conversation with the user according to a conversation schema of the action component of the identified rule and according to the one or more parameters, including (i) a conversation history according to which the conversation can be initiated with the user, and (ii) persistent data according to which the conversation can be initiated with the user, the persistent data indicating whether the user has enabled a quiet mode indicator according to which a determination can be made to not initiate the conversation with the user, despite the identification of the rule;
initiating the conversation according to the conversation schema and the determined subject matter; and
performing an action in response to a positive statement by the user.

14. The method of claim 13, wherein the detected fact is obtained from an electronic calendar of the user.

15. The method of claim 14, wherein the conversation schema specifies initiating a new conversation with the user that provides a reminder about user information.

* * * * *